US010755364B2

(12) United States Patent
Karroum

(10) Patent No.: US 10,755,364 B2
(45) Date of Patent: Aug. 25, 2020

(54) METHOD AND SYSTEM FOR PROVIDING A SOCIAL NETWORK FOR CREATING, SHARING AND ACCESSING CONTENT BASED UPON LOCATION AND MOBILITY-RELATED PROFILES OF USERS

(71) Applicant: Gloriam Technologies Pty Ltd., Balwyn North, Victoria (AU)

(72) Inventor: George Edward Karroum, Balwyn North (AU)

(73) Assignee: Gloriam Technologies Pty Ltd., Balwyn North (AU)

(*) Notice: Subject to any disclaimer, the term of this patent is extended or adjusted under 35 U.S.C. 154(b) by 299 days.

(21) Appl. No.: 15/559,406

(22) PCT Filed: Mar. 21, 2016

(86) PCT No.: PCT/AU2016/000099
§ 371 (c)(1),
(2) Date: Sep. 18, 2017

(87) PCT Pub. No.: WO2016/149736
PCT Pub. Date: Sep. 29, 2016

(65) Prior Publication Data
US 2018/0082384 A1 Mar. 22, 2018

(30) Foreign Application Priority Data

Mar. 23, 2015 (AU) ................................ 2015901030

(51) Int. Cl.
*G06Q 50/00* (2012.01)
*H04W 4/029* (2018.01)
(Continued)

(52) U.S. Cl.
CPC ......... *G06Q 50/01* (2013.01); *G06F 21/6218* (2013.01); *H04L 67/18* (2013.01);
(Continued)

(58) Field of Classification Search
CPC ...... G06Q 60/01; H04W 4/029; H04W 4/022; G06F 21/6218; H04L 67/18; H04L 67/306
See application file for complete search history.

(56) References Cited

U.S. PATENT DOCUMENTS 9,081,938 B1* 7/2015 Gauvin ................... G06F 21/10
2003/0028892 A1* 2/2003 Gewickey ........ H04N 21/23614
725/110

(Continued)

FOREIGN PATENT DOCUMENTS

WO 2014 027356 A1 2/2014

*Primary Examiner* — James R Sheleheda
*Assistant Examiner* — Franklin S Andramuno
(74) *Attorney, Agent, or Firm* — Craft Chu PLLC; Andrew W. Chu

(57) ABSTRACT

A method for providing a social network system includes providing a plurality of engagable mobility profile options for a user for continuous engagement of one or more of the mobility profiles in real-time; receiving a current mobility profile option selection of a user, wherein use of the system by a user is conditional upon the user having one or more concurrent mobility profile option selection(s); and allowing a user to create content. The content may be created with a user selected restriction upon the ability of other users to access the content based upon the current mobility profile option selection or selections of the other users.

19 Claims, 22 Drawing Sheets

(51) Int. Cl.
*H04W 4/021* (2018.01)
*H04L 29/08* (2006.01)
*H04W 4/02* (2018.01)
*G06F 21/62* (2013.01)
*H04W 4/21* (2018.01)

(52) U.S. Cl.
CPC .......... *H04L 67/306* (2013.01); *H04W 4/022* (2013.01); *H04W 4/025* (2013.01); *H04W 4/029* (2018.02); *G06F 2221/2117* (2013.01); *G06F 2221/2141* (2013.01); *H04W 4/21* (2018.02)

(56) References Cited

U.S. PATENT DOCUMENTS

| | | |
|---|---|---|
| 2011/0238762 A1 | 9/2011 | Soni |
| 2012/0214441 A1* | 8/2012 | Raleigh ............ G06Q 10/06375 455/406 |
| 2012/0324018 A1 | 12/2012 | Metcalf |
| 2013/0325988 A1 | 12/2013 | Morewitz |
| 2013/0343726 A1* | 12/2013 | Shackleton ........ H04N 21/4532 386/282 |
| 2014/0222908 A1 | 8/2014 | Park et al. |
| 2014/0363141 A1* | 12/2014 | Bonhomme ......... G11B 27/031 386/278 |
| 2014/0372904 A1 | 12/2014 | Liu |
| 2015/0006648 A1 | 1/2015 | Cao |

* cited by examiner

The graphical user interface and the mobility profile landing page preference selection

| Automatic | OR | Manual | | |
|---|---|---|---|---|
| Predictive | | MPSZ | OTFS | DFM |
| ○ | | ✓ PSZ1 ▼ / PSZ2 / ...... / PSZ N | ○ | ○ |

FIGURE 18

| | Mobility profile | Examples & notes | Static location | Dynamic | On the Fly selection | Pre-selected/Pre-saved location | Mobility profile tagging | Time |
|---|---|---|---|---|---|---|---|---|
| Option 1 MPSZn | Preselected Static Zone 1 called herein also as PSZ1 | Home's location of the user or business location for a business. | Yes | No | No | Yes | Yes (indicates a residency status) | A place where the user or a business ( or user's family) is/are most of the time |
| | Preselected Static Zone 2 called herein also as PSZ2 | User's children school location. | | | | | | |
| | ........ | User's parents house location. | | | | | | |
| | Preselected Static Zone N called herein also as PSZN, n is an integer for the maximum number of supported preselected static zones | User's place of work location | | | | | | |
| Option 2 OTFS | On The Fly Static called herein also as OTFS | User to Communicate with those at important location of his choosing, a place he has been to or place he plans to go to. | Yes | No | Yes | No | Yes (indicates a Virtual visitor status) | A place that the user has visited in the past or plans to visit as an actual visitor or as a virtual visitor now or in the future. |
| Option 3 DFM | Dynamic Full Mobility called herein also as DFM mobility profile | User to communicate with those at or around his current location. | No | Yes | N/A | N/A | Yes (indicates an actual /physical visitor status) | A place where the user is at present (now). Dynamic location updates with time (based on configurable time intervals). |

N/A= Not Applicable

FIGURE 20

| MPSZ1 | MPSZ2 | MPSZ3 | .... | MPSZn | OTFS(1) | OTFS(c) | OTFS(s) | OTFS(n) | OTFS(i) | DFM(1) | DFM(c) | DFM(s) | DFM(n) | DFM(i) |
|---|---|---|---|---|---|---|---|---|---|---|---|---|---|---|

Content from following sub mobility profiles

Section A'

Sub Mobility profile access and tagging workflow

Sub Mobility profile access and tagging workflow

FIGURE 23

Mobility profile status grouping and smart device notifications and actions triggering

| Human users | Automated Mobility mode | One or all at MPSZ1? | All not at MPSZ1? |
|---|---|---|---|
| Ur1h- (Father) | ON | Yes | no |
| Ur2h- (Wife) | ON | Yes | no |
| Ur3h- (Son) | ON | Yes | no |
| | | Notification 1 → | Notification 2 → |

| Smart Device Notification Trigger | Send notification | Action1 | Action2 |
|---|---|---|---|
| Ur4s-(Smart Air Condition) | ON | ON | OFF |
| Ur5s-(Smart home Alarm- away mode) | ON | OFF | ON |
| Ur6s-(Smart indoor Security Camera recording) | ON | OFF | ON |
| Ur7s- (Smart lights) | OFF | ON | OFF |
| Ur8s-(Smart oven) | ON | ON | OFF |
| Ur9s-(Smart garage door close check) | ON | OFF | ON | process flow chart showing the mobile profile status grouping check decision tree

METHOD AND SYSTEM FOR PROVIDING A SOCIAL NETWORK FOR CREATING, SHARING AND ACCESSING CONTENT BASED UPON LOCATION AND MOBILITY-RELATED PROFILES OF USERS

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to social network systems and in particular to systems employing user locations and mobility criteria.

The invention has been developed primarily for use with a social network system and will be described hereinafter with reference to this application. However, it will be appreciated that the invention is not limited to this particular field of use.

2. Description of Related Art Including Information Disclosed Under 37 CFR 1.97 and 37 CFR 1.98

Any discussion of the background art throughout the specification should in no way be considered as an admission that such background art is prior art nor that such background art is widely known or forms part of the common general knowledge in the field in Australia or worldwide.

All references, including any patents or patent applications, cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents forms part of the common general knowledge in the art, in Australia or in any other country.

Various technologies have been developed that provide geolocation based communication and social networking.

Communities use many online channels to connect & communicate online. The challenges facing all the communities of the world can be briefly summarized as follows:

Communities generally cannot mirror all the possible combined location(s) and mobility scenarios at the same point of time. Users can't know in real time, i.e. simultaneously and at the same point of time, the important local news as it happens in each of:
  the locations where their loved one are most of the time such as their homes, the school of their kids, their partner's workplace, the home of their parents.
  the local news around a selected location (on the fly) such as, for example, a destination; and
  the local news around their actual dynamically changing, real-time location (assuming they are on the move).

Businesses, law enforcement, emergency services, media, trade professionals and councils struggle to efficiently reach and communicate with their target audience and provide a much better service at much lower costs through the mosaic of community websites and applications.

Community members are unable to personalise, efficiently filter and consume the created community and government content that is usually delivered via different platforms and applications silos.

Current community social networks cannot engage residents or virtual visitors (national or international visitor) and actual visitors (national or international visitor) with relevant personalized information. Additionally, it cannot promote the community to visitors and residents in ways that are distinct from other areas.

Current applications cannot capture and analyse the mobility patterns of hundreds of thousands of people that move from their homes into urban areas or non-urban areas each day in each city in the world to work, play, live. These applications cannot provide valuable insights or analytics that can be used for urban planning, transport planning, tourism or business.

The complexity, variety of services, the size and the number of the community stakeholders made it very difficult for convergence and the use of one application for a smart community, smart city, and smart world social networking to happen.

The complexity will increase with the internet of things (IOT) and proliferation of devices, sensors, wearables, microchips for pets, machines, and APIs. There is no way to enable real time communication using all the current or future data sources to create a combined community situational awareness via one application for community members.

The complexity to manage the torrent of data especially the data associated with the mobility of users and combine that data with the content generated from other sensors.

The complexity facing the users who have to learn to use multiple heterogeneous community applications with different graphical user interface and additionally, retain multiple user name and passwords.

The inability to automate tasks or control of machines such as smart air conditions, smart blinds, smart home alarms via using a smart community social network to offload the users, save time, save energy, increase security and prevent accidents.

It is clear that the current fragmented approaches to serve the community communication proved to be inefficient and not economical. There is, therefore, a crucial need to do more with less for more people via one application, regardless of their mobility status, regardless of the type or the source of content, and regardless where they live, where they work and where they have fun. Challenges have to be looked at holistically and has to break down all the known silos of today. The world's cities and communities will need to get smarter and innovation is crucially needed across services to meet the challenges of tomorrow and to realise wider socio-economic benefits. This communication should cover the community communication needs across the country and internationally too; practically enabling all the communities of the world to connect with each other. The move from the fragmented community social networks to a converged one will create a smarter connected world and will unleash new innovative business & communication use cases. This convergence will have significant impacts on any smart city/smart community initiative and all the important macroeconomic variables such as public safety, GDP, energy consumption, carbon emissions and urban planning.

From another perspective, Internet and computer geolocation can be performed by associating a geographic location with the Internet Protocol (IP) address, MAC address, RFID, hardware embedded article/production number, embedded software number, invoice, Wi-Fi positioning system, device fingerprint, canvas fingerprinting or device GPS coordinates, or other, perhaps self-disclosed information. Geolocation usually works by automatically looking up an IP address on a WHOIS service and retrieving the registrant's physical address. IP address location data can include information such as country, region, city, postal/zip code, latitude, longitude and time zone.

While the existing geolocation communication and social networking provides the ability for users to communicate and interact with others based on a location, there continues to be room for significant improvement. The reason is that the existing methods and processes cannot provide a comprehensive and holistic solution to serve a broad range of user interests, user types, use cases or cover the users' complex location and mobility combinations.

The objective of the present invention is to overcome the existing limitations and ameliorate one or more disadvantages of the existing arrangements, or to at least provide an alternative.

It is to be understood that, if any prior art information is referred to herein, such reference does not constitute an admission that the information forms part of the common general knowledge in the art, in Australia or any other country.

BRIEF SUMMARY OF THE INVENTION

It is an object of the present invention to overcome or ameliorate at least one or more of the disadvantages of the prior art, or to provide a useful alternative.

One arrangement provides a computer program product for performing a method as described herein.

One arrangement provides a non-transitive carrier medium for carrying computer executable code that, when executed on a processor, causes the processor to perform a method as described herein.

One arrangement provides a system configured for performing a method as described herein.

According to a first aspect of the present invention, there is provided a method for providing a social network system for allowing users to: create and share content with other users; and access content created by other users; the method comprising: providing a plurality of engagable mobility profile options for a user for continuous engagement of one or more of the mobility profiles in real-time, wherein said mobility profile options include: at least one first option comprising a unified combination of multiple preselected and stored first geographic locations and a first mobility status; and a second option comprising a unified combination of a temporary selected geographic location and a second mobility status; and a third option comprising a unified combination of a continuously updating geolocation and a third mobility status wherein said mobility profiles are adapted to be activated one at a time or concurrently with any one or more user mobility profiles; receiving a current mobility profile option selection of a user, wherein use of the system by a user is conditional upon the user having one or more concurrent mobility profile option selection(s); allowing a user to create content, wherein the content may be created with a user selected restriction upon the ability of other users to access the content based upon the current mobility profile option selection or selections of the other users.

Preferably, the content may be created with a user selected restriction upon the ability of other users to access the content based upon the fixed or current geographical location of the current mobility profile option selection of the other users falling within or outside of a user selected geographical zone.

Preferably, a user may restrict the user's own accessibility to content created by other users based upon the created content being created within the geographical zone corresponding to the user's current mobility profile option selection.

Preferably, for the first option or one of the first options the fixed geographical location is a fixed geographical location selected by the user before or during selection of the current mobility profile option.

Preferably, for the first option or one of the first options the fixed geographical location is a stored fixed geographical location preselected by the user. When there are multiple first options available as different selectable mobility profile options, each first option defines a different preselected fixed geographical location. A user may be denied access to content having access criteria defined by any of the first geographical zones of the user's non-selected mobility profile first options regardless of whether the user's current mobility profile option selection would otherwise meet the access criteria.

Preferably, the size of the first and/or second and/or third options geographical radius associated with each of the first, second and third mobility profiles for search, browse or for notifications is granular to a channel and category level and is selected by the user.

Preferably, created content is tagged with the current mobility profile selection of the user that created the content and the tag is displayed to other users that can access the created content.

Preferably, users receive notifications of when there is newly created and accessible content.

Preferably, multiple content that is accessible for a user is ranked to determine an order for displaying the multiple content.

Preferably, a plurality of channels is also provided, wherein users must select a channel in order to create content within the selected channel or access content created within the selected channel. User access to a selected channel may be subject to the user meeting access criteria. The user access to a selected portion of a channel including a channel's tab or tabs or a channel sub tab or sub tabs is subject to the user meeting the access criteria. The access criteria may include restrictions based upon the current mobility profile option selected by the user.

Preferably, a user may select to change to a different mobility profile option while accessing the system, whereby the newly selected option becomes the current mobility profile option selection.

Preferably, the system automatically selects a current mobility profile option selection for the user. The automatic selection may be based upon a preselected user preference or based upon a prediction employing a user's history of use.

Preferably, the content that may be created includes one or more of posts, calendar events and private or public user groups, video feeds, SMS messages, files, alarms, sensor data, photographs, or weather forecast data and the like as would be appreciated by the skilled addressee.

Preferably, the content may be created with a user selected restriction upon the ability of other users to access the content based upon the fixed or current geographical location of the current mobility profile option selection of the other users falling within a user selected distance from the fixed or current geographical location of the user's current mobility profile option selection.

According to a further aspect of the invention, a social network system for allowing users to create and share content with other users is provided. The system includes:
- a database for storing data pertaining to users of the system; and
- a server connected to a communications network for communicating with user devices over the communications network; wherein the server is programmed to provide the aforementioned method.

Other aspects of the invention are also disclosed.

In an exemplary embodiment, the system includes a geolocation engine supporting multiple mobility profiles. The Geolocation engine supports at least three mobility profiles, for example: Multi Preselected Static Zones (MPSZ) mobility profiles, On-The-Fly Static (OTFS) mobility profile and Dynamic Full Mobility (DFM) mobility profile.

The MPSZ mobility profile allows the user to access the application based on a user's stored fixed geographical locations preselected by the user. In this case, the preselected geolocations of these multiple zones will be the centre of the geolocation interaction between the user and other users, all content and logical objects. The user does not need to physically be at any of the selected locations to access this mobility profile.

The OTFS mobility profile allows the user to access the application based on entering an address or pointing to a location on the map and make this new address or this new point on the map as the new static centre of geolocation interaction with the application and other users, all content and logical objects. The user does not need to physically be at this location to access this mobility profile.

The DFM mobility profile allows the user to access the application using his actual dynamic location as provided by his GPS enabled device or any other dynamic geolocation method. In this case, the location of the device as provided by the GPS or other geolocation method will be the centre of his geo interaction with the application. In this profile the application is continuously updating the GPS location of the device such that the user's current location is always immediately available to be associated with content created by the user or to access content relevant to the user's real-time location.

The geolocation mobility profile engine allows the users to easily switch between the different mobility profiles. The geolocation engine allows the users to access content from a plurality of mobility profiles simultaneously in real-time, or to create content which is then associated with each one of the plurality of mobility profiles that the user is connected to at the time the content is created.

A method for providing a social network system for allowing users to: create and share content with other users; and access content created by other users; the method comprising: providing a plurality of user-types; providing a plurality of mobility profile options for each user-type to provide a user with continuous engagement with content associated with one or more mobility profiles in real-time, wherein said mobility profile options include: at least one first option comprising a unified combination of multiple preselected and stored first geographic locations and a first mobility status; and a second option comprising a unified combination of a temporary selected second geolocation and a second mobility status; and a third option comprising a unified combination of a continuously updating third geolocation and a third mobility status; wherein said mobility profiles are adapted to be activated one at a time or concurrently with any one or more user mobility profiles; receiving a current mobility profile option selection of a user, wherein use of the system by a user is conditional upon the user having at least one or more user selected concurrent mobility profile option selection(s); and allowing a user to create content, wherein the content may be created with a user selected restriction upon the ability of other users to access the content based upon the current mobility profile option selection or selections of the other users; and wherein content associated with one or more mobility profiles comprises user-type access restrictions to restrict interaction with the content to selected user-types.

A method for providing a social network system for allowing users to: create and share content with other users; and access content created by other users; the method comprising: providing a plurality of mobility profile options for each user-type to provide a user with continuous engagement with content associated with one or more mobility profiles in real-time, wherein said mobility profile options include: at least one first option comprising a unified combination of multiple preselected and stored first geographic locations and a first mobility status; and a second option comprising unified combination of a static temporary second geolocation and a second mobility status; and a third option comprising a unified combination of a continuously updating third geolocation and a third mobility status; wherein said mobility profiles are adapted to be activated one at a time or concurrently with any one or more user mobility profiles; receiving a current mobility profile option selection of a user, wherein use of the system by a user is conditional upon the user having at least one or more user selected concurrent mobility profile option selection(s); and allowing a user to create content, wherein the content may be created with a user selected restriction upon the ability of other users to access the content based upon the current mobility profile option selection or selections of the other users; wherein the social network system is adapted to provide a user that is simultaneously connected to a plurality of mobility profiles with notifications of content created in association with each of the connected mobility profiles.

According to a further aspect of the invention, there is provided a method for providing a social network system as claimed in any one of the preceding claims, wherein the method further comprises: providing one or more sub-mobility-profile options for the OTFS and DFM mobility profile options, for a more differentiated and enriched mobility profile access to content and content creation, content sharing and content masking, wherein the multiple sub mobility profile options are selected by the user or for the user and wherein any content created and shared by the user while this profile is engaged will be tagged with the sub mobility profile tag.

In an exemplary embodiment, the method and system may further include a user's mobility profile history & prediction module that when engaged, will automatically select the mobility profile of the user at login or when the user activates the application on his computing device.

In an exemplary embodiment, the method and system may support multiple computing devices via web access, mobile site access and native mobile applications.

In an exemplary embodiment, the system consists of channels each including multiple tabs to support a structured & organized communication. An example of tabs can be as follows: post tab, search & browse tab, create groups tab, & search and join groups tab. Other tabs can be added. Each channel has one or more drop down menus that contains multiple categories. The post tab or search& browse tab support Boolean Algebra (AND/OR) allowing posts containing one or more categories to be created users. A server is operable to receive and display the channels categorized information based on geolocation from multiple users, multiple user types and the used mobility profiles during posting, reply or group creation. Access to the channels and tabs (or sub tabs) depends on the user profile and the user's selected mobility profile via the geolocation engine.

In an exemplary embodiment, the system generates a "Geo mobility profile" tagging. This means that when content or an object is created (example: create a post, reply, event, or a group etc.), it will be mobility profile tagged. This means that users can see the mobility profile that was used when the content or object was created.

In an exemplary embodiment, the system can rank and present the created content or objects (example: create a post, reply, event, or a group etc.) to users based only on the mobility profile or based on the mobility profile blended with other categories, such as content category, distance from the user's selected mobility profile geolocation centre, user's internal history of use or other external data sources such as the user's history of use and external social media profiles etc.

In an exemplary embodiment, groups for a private communication between group members can be created based on multiple mobility profiles. In this case, groups will have a mobility profile tag at the creation points.

In an embodiment, a server is further operable in the event some criteria are met, where these criteria can be set by the administrator, the user or both such as sending categorized notifications to the users. For example, based on the user A's settings, he can get notifications when posts are made under specific categories in the channel(s), under a specific mobility profile (associated with the other users who posted) and within a specified threshold distance from the centre of mobility profile used by user A when accessing the application. Radius and mobility profile is per category and can be set differently by user A. User A can get notifications too if replies are made in response to his posts even if he is using different mobility profiles when he is posting.

These as well as other aspects and advantages that will become apparent to those of ordinary skill in the art by reading the following detailed description, with reference where appropriate to the accompanying drawings. Further, it is understood that this description is merely an example and is not intended to limit the scope of the invention to social networking as claimed as the invention could be used as an innovative community situational awareness dashboard too. The present claims go beyond the mere concept of simply retrieving and combining data using a computer. In fact, it results in faster computation time compared to as occurred in prior processes, and produces an improved geo location processing. These are also improvements in the technology of geo location and geo tagging and geo data processing. The present claims are not merely limiting the abstract idea to a computer environment by simply performing the idea via a computer (i.e., not merely performing routine data receipt and storage or mathematical operations on a computer), but rather is an innovation in computer technology, namely geo location and geo tagging processing, which in this case reflects both an improvement in the functioning of the computer and an improvement in another technology. Taking all the additional claim elements individually, and in combination, the claims as a whole amount to significantly more than the abstract idea of geo location and geo tagging.

BRIEF DESCRIPTION OF THE SEVERAL VIEWS OF THE DRAWINGS

Notwithstanding any other forms which may fall within the scope of the present invention, a preferred embodiment of the invention will now be described, by way of example only, with reference to the accompanying drawings.

FIG. 18 illustrates a schematic view of a comparison table between different mobility profile types.

FIG. 20 shows a schematic view of an example of the graphical user interface for additional notifications selection criteria (user sub mobility profiles).

FIG. 23 shows a schematic view of an example of the graphical user interface for Mobility profile status grouping and smart device notifications and actions triggering.

DETAILED DESCRIPTION OF THE INVENTION

Figure 1:
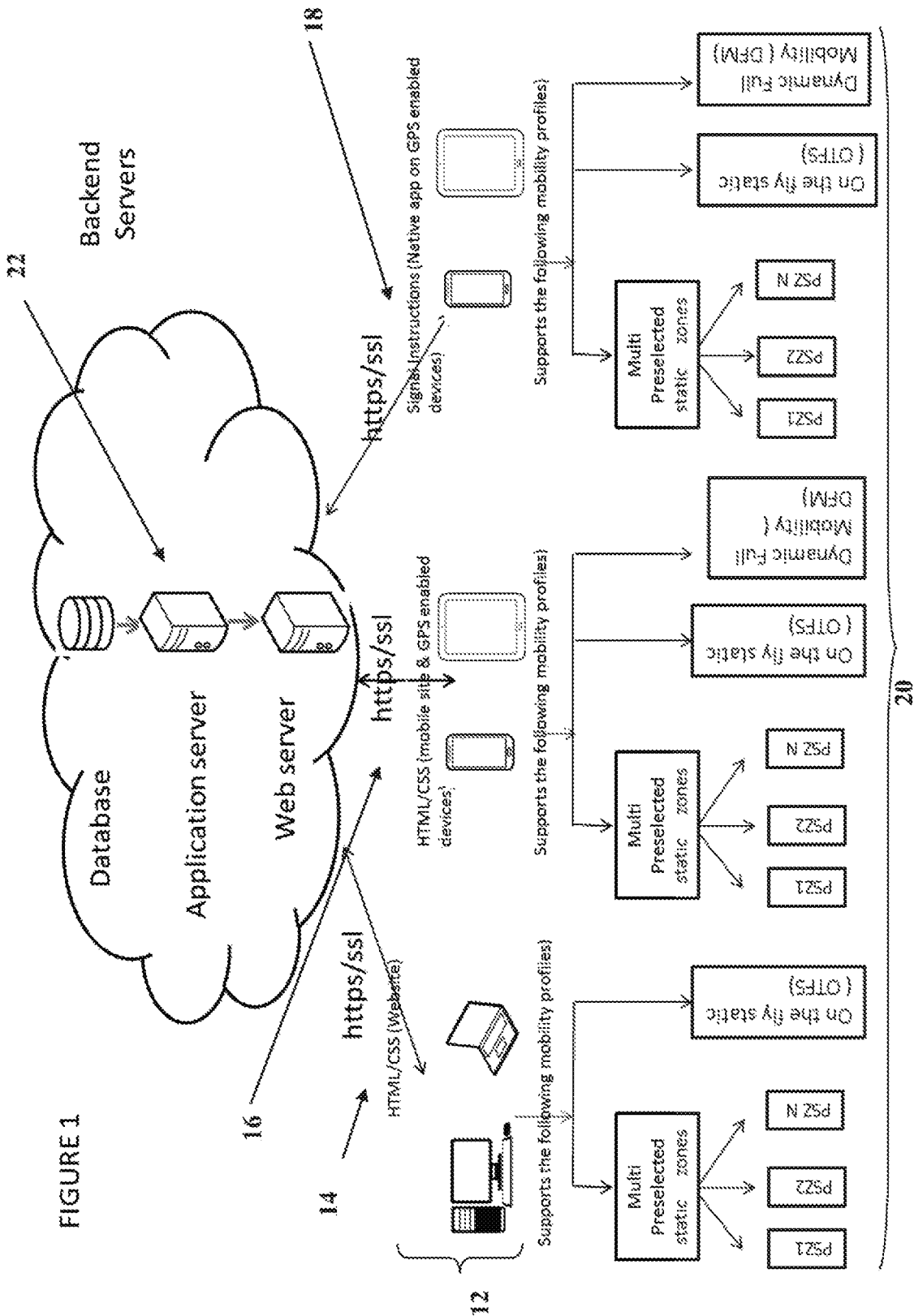
FIG. 1 is a schematic view of a diagram of a system according to a preferred embodiment showing the supported mobility profiles for different access devices.

It should be noted in the following description that like or the same reference numerals in different embodiments denote the same or similar features.

The preferred embodiments describe systems and methods for geolocation communication & internet social networking comprising multiple communication channels, multiple user types, multiple mobility profiles, a mobility profile prediction module, mobility profile geolocation zone block, mobility profile geo-tagging and mobility profile access.

In an embodiment, the method and system may support multiple computing devices 12 via web access 14, mobile site access 16 and native mobile applications 18.

FIG. 1 represents a diagram of the supported mobility profiles 20 for the different access devices.

In an embodiment, the system includes a geolocation engine supporting multiple mobility profiles 20. The geolocation engine supports 3 mobility profiles as follows: Multiple Preselected Static Zones (MPSZ) mobility profiles, On-The-Fly Static (OTFS) mobility profile and Dynamic Full Mobility (DFM) mobility profile.

The MPSZ mobility profile 42 allows the user to access the system based on stored fixed geographical locations that were pre-entered or preselected by the user preferably at some earlier stage. In this case, the geolocations of these multiple zones will be the centres of the geolocation interaction between the user and other users, content and assets. As an example, if the user selects Preselected Static Zone 1 (PSZ1), the pre-selected geolocation of static zone 1 will be the new centre and reference for geolocation interaction with the system. If the user selects Preselected Static Zone n (wherein n is an integer), the pre-selected geolocation of static zone n will be the new centre and reference for geolocation interaction with the system.

For example, MPSZ1 can preferably be the home's location of the user or business location for a business. In this case, this mobility profile uses the user's preselected home residential address or business address (e.g. if it's a business such as a restaurant, dry cleaning, milk bar shop address) provided preferably at the registration phase as his/it's location when engaged. Once this profile is engaged, either by the user or for the user (via an automated selection process), the application will holistically consider the user as holding a form of residency status and will work as the social network for communicating with the users and content at or around his home. MPSZ2 can be the user's children school location and MPSZ3 can be the user's parent's house location that are in other distant locations such as another city, state or even country.

Preferably, for MPSZn profiles the user will have to confirm that he/she resides in a suburb. For MPSZ1, user can preferably verify his address via many methods such as using a wired internet connection at the registration or verifications stage & the application compares the provided address with the approximate geolocation of the wired router that the user is using to access the application. Alternatively, the application can send a server generated code via post that has to be provided and validated online via the application once received by post. Manual options could be to contact the user via a wired phone at home or at the business address to manually confirm and validate his location.

Other methods to increase the credibility of the user's profile could be to link his other social networks accounts to the application. For MPSZ2 (example: school location), the school can get one code, and this code can be exchanged with the parents and the application will allow the reuse of the code for the same geolocation multiple times as a mean to validate this mobility profile.

This mobility profile indicates a form of 'residency status'. From a time perspective, it will indicate that this is a place where the user or a business (or user's family) is/are most of the time or spends a relatively long time.

The OTFS mobility profile 44 allows the user to access the application based on entering an address or pointing to a location on a map and make this new address or this new point on the map as the new centre of geolocation interaction with the system and other users. In effect, this is also a static zone geolocation. However, the location can be any location selected by the user on-the-fly, say, as a temporary location about which the user is interested, as opposed to a preselected or pre-saved location. Thus as disclosed herein, an "on-the-fly" (OTF) location or zone is to be understood as a temporary location that the user is interested in at a particular time, for example, where a user is travelling to a particular destination, the user may select the travel destination as a temporary geolocation about which they are interested i.e. to receive weather or news updates about their current destination.

The mobility profile associated with an on-the-fly or temporary location selection will indicate a form of 'virtual visitor' status in respect of the selected location. From a time perspective, it will indicate that the selected location is a place that the user is interested in, has visited in the past or plans to visit this location in the future.

Once this profile is engaged by the user (or for the user via an automated selection process), the application will holistically consider the user as a virtual visitor and works as the social network for communicating with the destination's users and content at or around the user's destination location.

Setting the mobility profile to OTFS when creating content enables the user to create posts or private groups anywhere he chooses on the map. Any content that the user creates or searches for will be based on this new location. Hence, the user can turn any specific location into a virtual notice board or a private discussion room.

For example: surfing enthusiasts (using the OTFS mobility profile) can create private groups or content at the geolocation of their surfing beach destination location on the weekend to connect with each other. Football fans can create content at the stadium's geolocation before a match for a post-match drink or to organise seats during the match. Residents can connect with each other to unite and organise opposition against a planned mega mall in their quiet suburb by using the OTFS profile and selecting the geolocation of the planned mega mall.

The DFM mobility profile 46 allows the user to access the system using his actual location as provided by the user's GPS enabled device or any other suitable geolocation method. In this case, the location of the device as provided by the GPS or other geolocation method will be the centre of the user's geolocation interaction with the system. Given that the user's location can be changing as the user moves, this provides a dynamic aspect to this particular profile, meaning that this mobility profile supports periodic location updates preferably based on configurable time intervals for both, the website (dedicated physical servers or cloud-based) or mobile apps. This will be done in an automated way without the user's intervention or the need to press a button each time before he creates a content to update his location. If the user keeps on changing his location while this mobility profile is engaged, the content that the user will create or be able to access will consequently change with time as his location will keep changing. This allows content to be created/accessed on the go. To note that while the user changes his location when this mobility profile will be engaged, the geolocation coordinates of the created content by the user will change in this case, and have different geolocation coordinates as the mobility profile is fully dynamic.

From another perspective, the content that the user will be able to access or get notifications for will change based on his changing location and the DFM mobility profile's periodic location update cycles.

DFM uses the current geolocation coordinates of the user for connecting with those at or around their actual present location. This mobility profile indicates a form of 'actual/present physical visitor' status. From a time angle, it will indicate that this is a place where the user is at present (now). Once this profile is engaged by the user or for the user (via an automated selection process), the application will holistically consider the user as an actual current visitor and works as the social network for communicating with the users and content at or around his actual location.

FIG. 18 provides a comparison table showing the different characteristics of the different mobility profile options.

The method supports different types of devices 12 and supports different mobility profiles 20. Desktop or laptops are generally stationary and not equipped with GPS, consequently it can be arranged so that they only support MPSZ and OTFS mobility profiles.

In this diagram, GPS (Global Positioning System) for DFM mobility profile is used just as an example for a technology needed to determine the dynamic physical geolocation of the user. This is not intended to limit the scope of this invention or restrict the DFM mobility profile to the global positioning system technology only. Other technologies available today or in the future besides GPS can be used to support the DFM mobility profile.

In this diagram, the 3 tier server architecture 22 is used just as an example and shouldn't limit the scope of this invention as different one tier, two tier or three tier backend server's architecture may be used.

Figure 2:
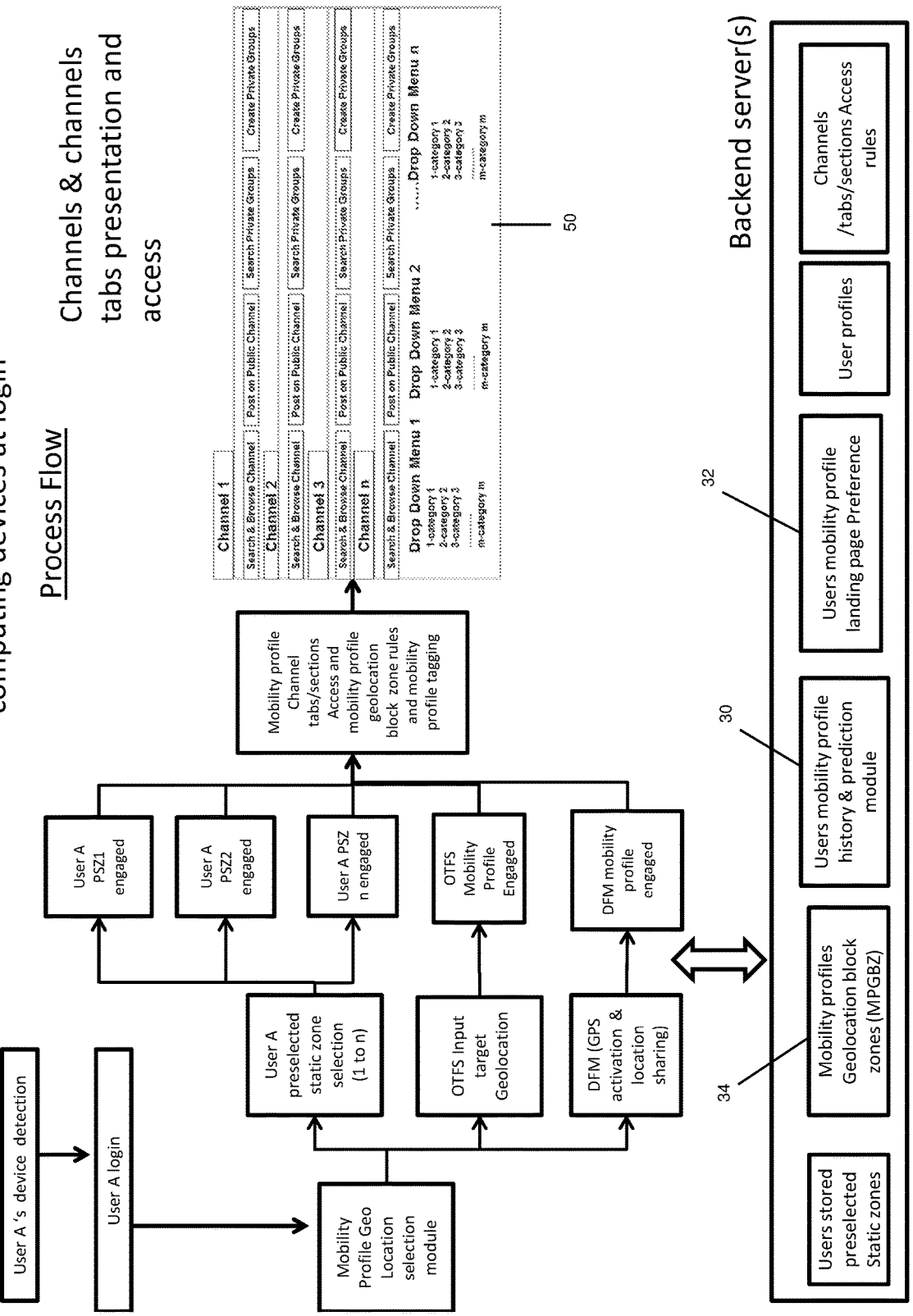
FIG. 2 is a schematic view of a block diagram for the Geolocation mobility profile Engine and process flow for the system of FIG. 1.

The geolocation engine supports a mixture of static and dynamic mobility profiles. The engine allows the users to easily switch between the different mobility profiles. FIG. 2 shows a block diagram for the Geolocation mobility profile Engine and process flow. There are three options here:
  a. After the user's login and based on the user's type, the user will be directed to the landing page of a specific mobility profile as default (as set by the system administrator).
  b. After the user's login, the mobility profile landing page will be based on the mobility profile prediction module 30
  c. After the user's login, the mobility profile landing page will be based on the user's mobility profile landing page preference 32 selection made in the settings section.

For options b and c, further sub-options can include (depending upon the device):
  Preselected Static zone number X (where x=1 to n and where n is the number of available static zones), or
  OTFS mobility profile input target geolocation page, or DFM mobility profile and the activation of GPS or the usage of any other dynamic geolocation method or system.

In an embodiment, the method and system may further include a user's mobility profile history and prediction module 30 that, when engaged, will automatically select the mobility profile of the user.

For option b, if engaged by user in the settings section, the prediction mobility module 30 may automatically select for the user a mobility profile after login. The selected mobility profile will depend on the user mobility profile history such as the previous commonly engaged mobility profile, frequency of engagement, engaged mobility profile time, login time, login date, login day of the week, previous accessed channels, previous online actions and other external associated social media profile of the user.

It will be appreciated that for users who are always online; the automated mobility profile selection can be used all the time, and not only for the landing page after login. This will let the application periodically check and scan their mobility status and continuously select and engage a mobility profile for the user in an automated way.

It will further be appreciated that additional inputs could be added to the automated mobility profile module before engaging a mobility profile such as a mobile device's accelerometer.

For example, where the user's mobile device includes an accelerometer, if the accelerometer detects an acceleration, and the user is currently using MPSZ1 mobility profile, the application will compare the user's location with the MPSZ1 stored geolocation and may be configured to: disengage the MPSZ1 mobility profile; and engage the DFM mobility profile for the user.

Other complex rules can be created to create more use cases using the specific user types, channels and all the aspects described in this document, as would be appreciated by the skilled addressee.

For OTFS mobility profile or DFM mobility profile, the "mobility profile geolocation block zone" 34 check function may be done at the last step before the final channel access step.

For all these processes, the backend application/DB servers 22 will be queried.

Figure 3:
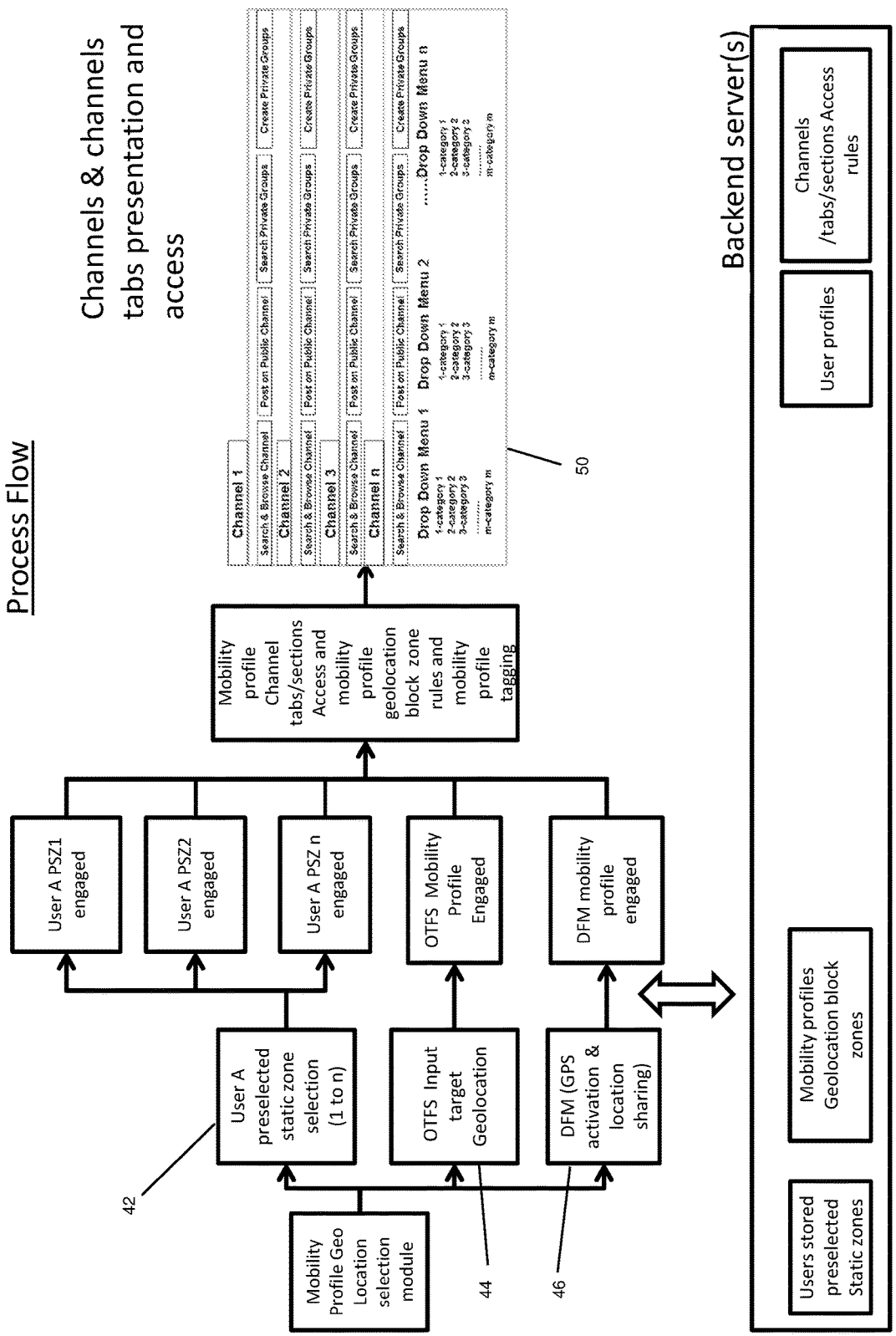
FIG. 3 is a schematic view of a block diagram for the Geolocation mobility profile Engine and process flow of FIG. 2 after login.

FIG. 3 shows a block diagram for the Geolocation mobility profile Engine and process flow after login.

The engine in this scenario will allow the user to switch between the following different mobility profiles (if supported by the user's device):

a. Static zone number (PSZx)42 (for x=1 to n where n is the number of available static zones);
b. OTFS mobility profile 44; and
c. DFM mobility profile 46 and the activation of GPS or any other suitable dynamic geolocation determination method or system.

In an embodiment, the system consists of channels 50 each including multiple tabs 52 to support a structured & organized communication. Example of tabs 52 can be as follows: post tab, search & browse tab, create groups tab, & search and join groups tab. Other tabs can be added. Each channel has one or more drop down menus 54 that contain multiple categories 56. The post tab or search & browse tab support Boolean Algebra (AND/OR) allowing posts containing one or more categories to be created by users. A server is operable to receive and display the channels categorized information based on geolocation from multiple users, multiple user profiles and the used mobility profiles during posting or reply. Access to the channels 50 and tabs 52 is granular to the tab level and depends on the user profile and the user's selected mobility profile via the geolocation engine.

In particular embodiments, the application may be configured to give access to a specific tab and/or sub tab and/or a user type and/or a specific mobility profile and/or for channel. For example: Channel "Suburb news" can only be accessed by user type "resident" and only MPSZ1 mobility profile and DFM and not OTFS. In a further example: channel "Police Updates" and 'create content' tab and 'create content' sub tabs can be accessed by user type 'police' only.

Figure 4:
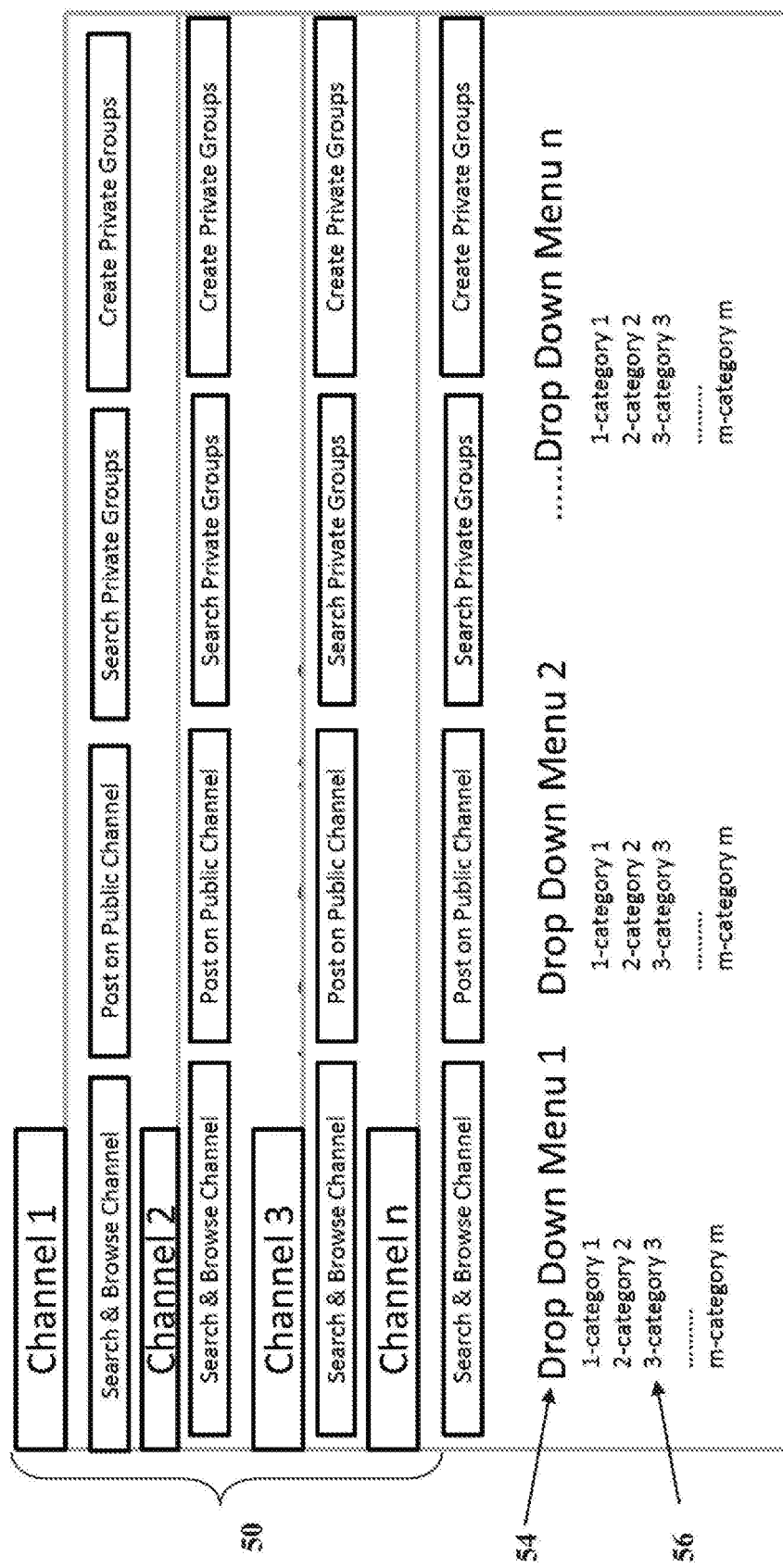
FIG. 4 shows a schematic view of the multiple channel structures and multiple tabs for the system of FIG. 1.

FIG. 4 shows a diagram of the multiple channel structures 50 and multiple tabs 52. The tabs example here shows 4 tabs 52, but more tabs can be added and this shouldn't limit the scope of the current invention. Each tab could have a different section and each section can have different access rights for users based on their user type and their mobility profile. Channels can be used for public communication for the authorized users while groups are for private communication only between the group members.

Figure 5:
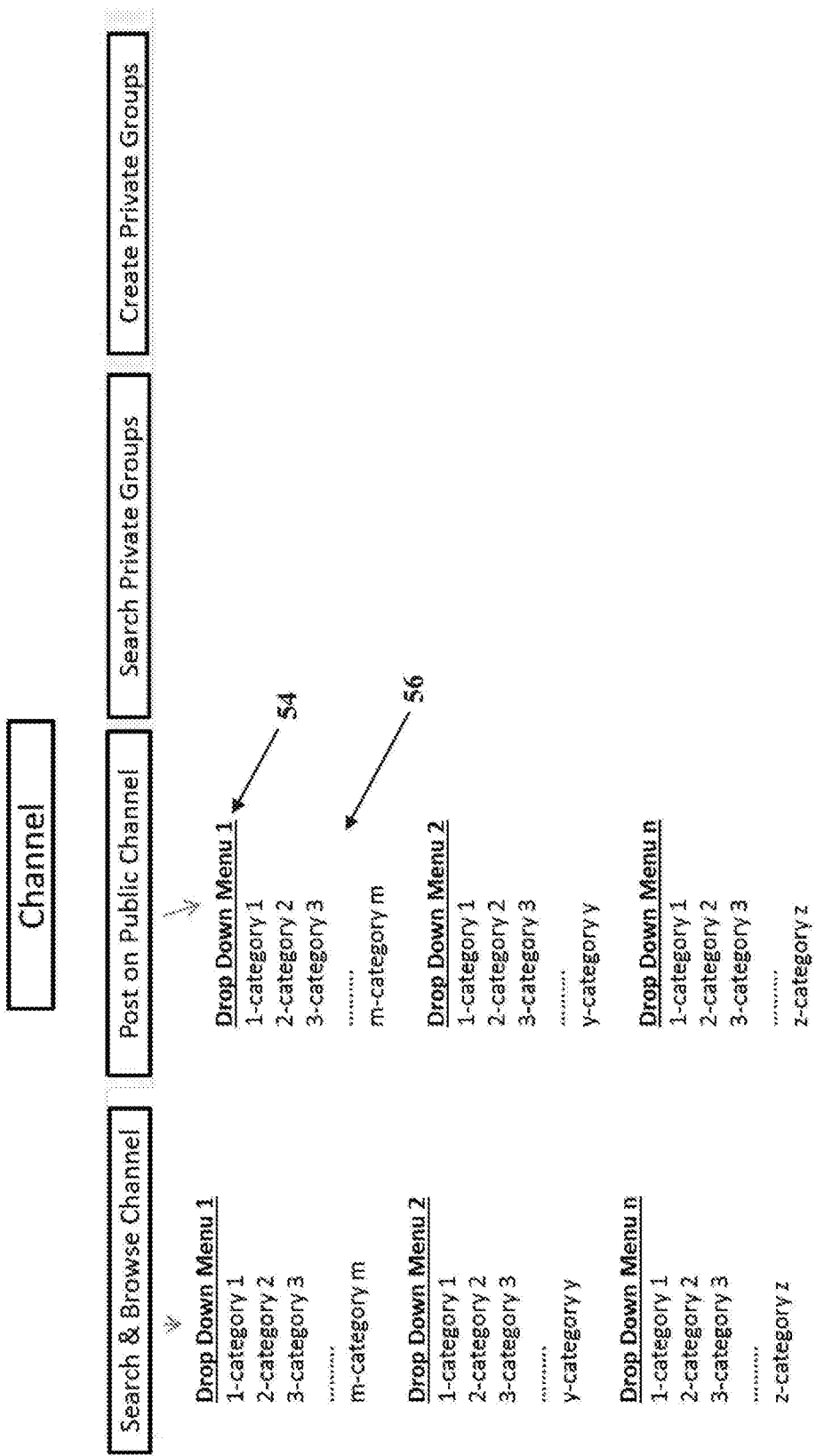
FIG. 5 is a schematic view showing the content of a channel and the multi drop down menus with multiple categories for FIG. 4.

FIG. 5 shows a diagram for the content of a channel and the multi drop down menus with multiple categories.

Searching can include search for posts made in a specific category and based on a specific mobility profile. Channel posting can be public for all the users, while groups can be private for group members. Groups also support mobility profiles. A group will have multiple attributes such as location, channel, subject and a creation mobility profile (mobility profile used by the user when he created the private group).

In an embodiment, a server is further operable in the event some criteria are met, where these criteria can be set by the administrator, the user or both, such as sending categorized notifications to the users. For example, based on the user A's settings, he can get notifications when posts are made under specific categories in the channel(s), under a specific mobility profile (associated with the other users who posted) and within a specified threshold distance from the centre of mobility profile used by user A when accessing the application. Radius and mobility profile is per category and can be set differently by user A. User A can get notifications too if replies are made in response to his posts even if he is using different mobility profiles when he is posting.

Figure 6:
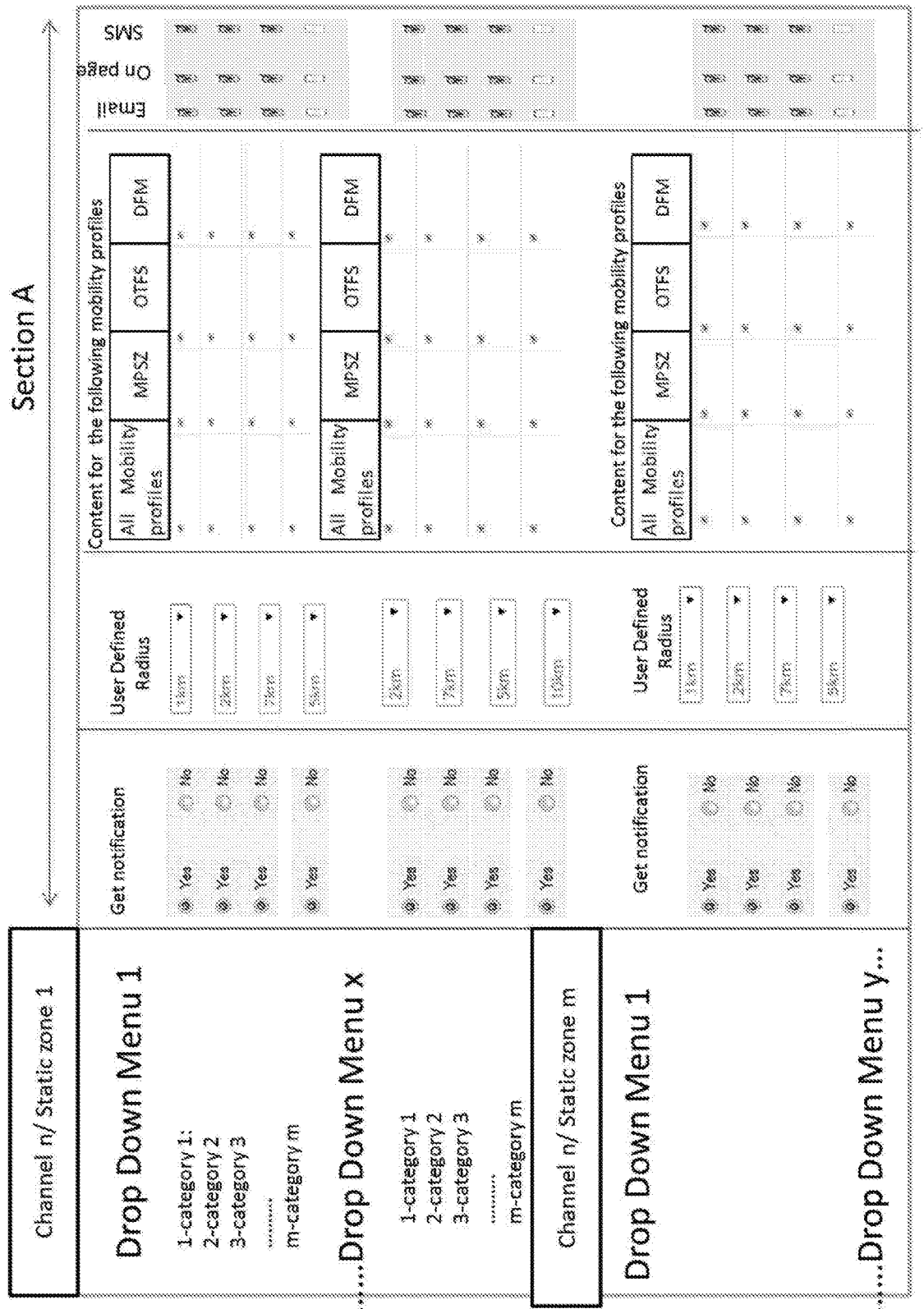
FIG. 6 shows a schematic view of an example of the graphical user interface for selecting notification for channels for multiple categories based on different radius and different posts mobility profiles.

FIG. 6 shows a conceptual diagram illustrating an example of the graphical user interface for selecting notification for channels for multiple categories based on different radius and different posts mobility profiles. Boolean algebra AND/OR function for posts categories or mobility profile may be supported.

In this diagram, as an example (not intended to limit the scope of this invention), based on the users A's settings, he can get notifications when posts are made under specific categories in the channel(s), under a specific mobility profile (associated with the other users who posted) and within a specified threshold distance from the centre of the mobility profile used by user A when accessing the system. Radius and mobility profile is per category and can be set differently by user A. User A can get notifications too if replies are made in response to the posts he made when he is using different mobility profiles.

For example: a user will be able to get real time notifications in one screen for specific content (based on his previous notification preselection) created within a specific radius from his home (MPSZ1), the school of his kids (MPSZ2), the home of his old parents (MPSZ3), the place of work/office of his wife (MPSZ4), his destination and his actual location at the same point of time. The content can be from users, government, police, sensors and machines. Example: home fire sensors, traffic lights and car flow sensors, pollution sensors, police updates etc. This will allow the user to have one dashboard that covers his mobility status, locations and categories of interest.

Users can get notifications from other mobility profiles in real time at the same point of time while they are on a different mobility profile, meaning that the user can virtually use more than one mobility profile at the same point of time. In an embodiment, a consolidated notifications view for all the mobility profiles can be displayed concurrently in one screen. This will allow the user to get notifications from multiple static locations (preselected MPSZn or on the fly OTFS) and dynamic locations (DFM). Hence, if the user configures his settings to get notifications, and if he provides a destination, and engages the consolidated notifications screen view; the user will get real time notifications from all his multi preselected static locations AND his destination location AND from his actual location at the same time in one screen (mobile device, tablet or a connected car mounted tablet, computer, or dashboard while he moves or drives to his destination location. This means that the user can access more than one or all multiple mobility profiles at the same point of time.

Figure 7:
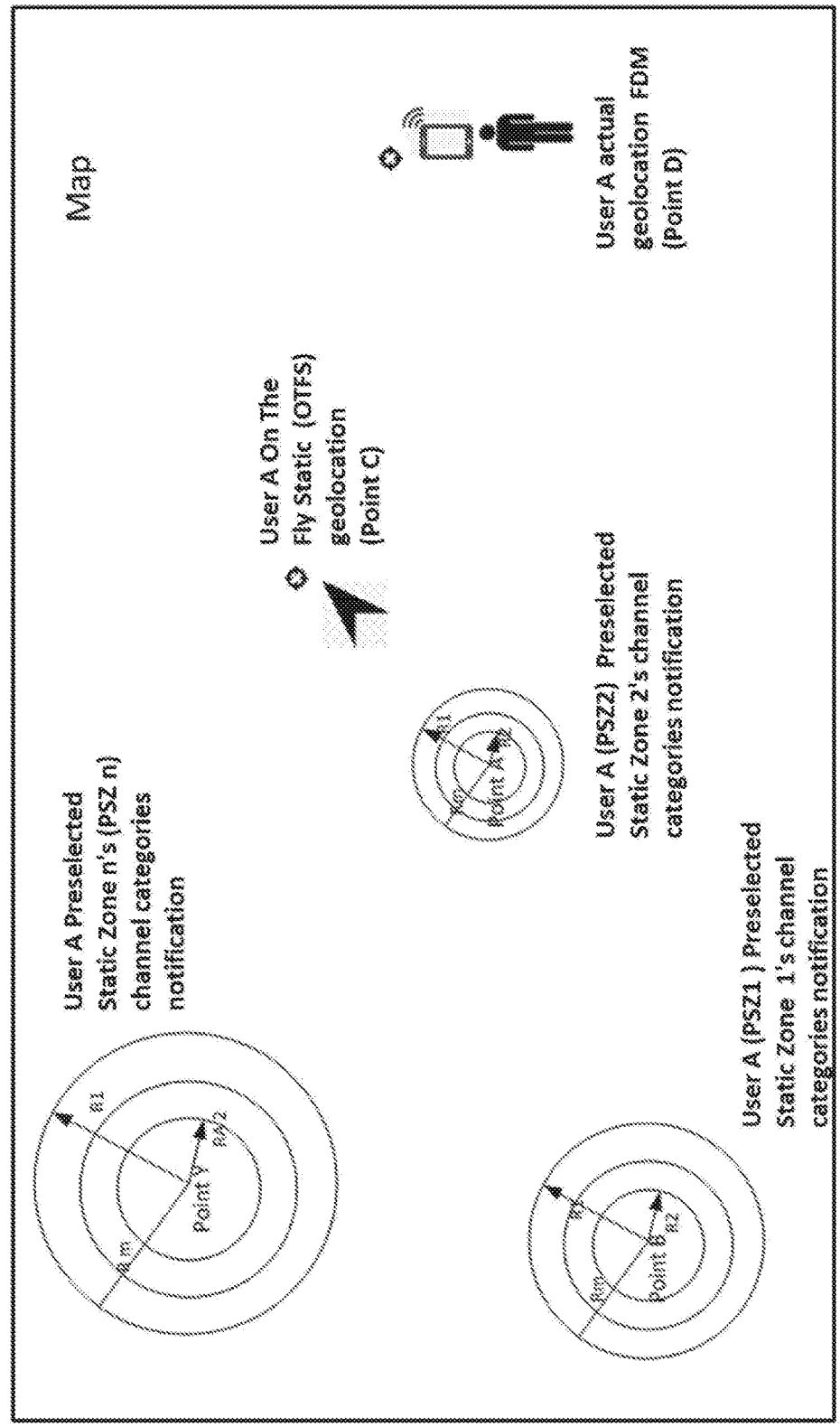
FIG. 7 shows a schematic view of multiple mobility profiles and variable category/radius notifications supported for the multi static zones.

FIG. 7 shows a diagram for the multiple mobility profiles and variable category/radius notifications supported for the multi static zones.

The user can have multiple static zones and can get for each channel and for each category notifications based on a specific radius (per category for the geographical target areas) and for specific mobility profiles. This means that he can get emails or on-page notifications if posts are made within the threshold radius defined by the user for a specific defined category or categories for a specific channel(s) and for a defined mobility profile(s).

In an embodiment, some channels/tabs and/or sections will not allow the OTFS or DFM mobility profiles access and/or a specific user type. For example, the channel 1 post tab is to be accessed only by a non-commercial user type for the MPSZ mobility profile or only particular preselected zones from among the MPSZ mobility profile options.

In an embodiment, the system generates a "Geo mobility profile" tagging for the created objects and content. This means that when a user posts in a channel, makes a reply, creates a calendar event or even creates a group, other users can see the mobility profile used by this user when he posted, replied or created the group.

Hence, the mobility profile tagging is the process of 'capturing' the mobility profile option selected by the user that created the content at the time the content was created. This is not geolocation tagging as the geolocation tagging captures only the location, not the mobility profile used at the time of content creation. For example, if the user uses the DFM mobility profile when he creates content, the content will have the DFM mobility profile tag associated with it. This indicates that this user was an actual visitor of the location at the time this content was created.

For example, for the created content, and assuming a periodic location update time interval of 1 millisecond and assuming user A and user B at time 0 shares the same geolocation point X. If user A engages the DFM mobility profile and moves at a speed of 100 km/per hour away in a direct line shape south from user B and if user A created three different (say content F, G, H) contents at time 0, after 30 minutes and after 60 minutes while keeping the same speed, the content from the perspective of user B (assuming that user B is using one of the static mobility profiles locked at location X and is not changing this mobility profile from time 0 to 60 minutes) when he checks the content created by user A will be as follows:

Content F will have a relative distance (between the 2 engaged mobility profiles of user A and user B) of 0 KM and a mobility profile tag of DFM at time 0;

Content G will have a relative distance (between the 2 engaged mobility profiles of user A and user B) of 50 KM and a mobility profile tag of DFM at 30 minutes; and Content H will have a relative distance (between the 2 engaged mobility profiles of user A and user B) of 100 KM and a mobility profile tag of DFM at 60 minutes.

In an embodiment, the system can rank and present posts to users based on the blended associated mobility profiles, category and distance from the user's selected mobility profile geolocation centre.

Hence, any content shared/created by a user will indicate the relative location of the used mobility profile and will also indicate the mobility profile status (mobility profile tag). It should be noted that the application captures the geolocation coordinates and the mobility profile in use by the user who created the content at the time of the creation of the content. The application then computes the relative distance between the geolocation coordinates of the created content and the geolocation coordinates of the mobility profile used by the other user who reads or accesses this content. It will be appreciated that this display of differentiated content is not only limited to web or mobile application, but covers as well any current or future presentation method such as a virtual street view on a map, a map or any virtual reality glasses technology.

In an embodiment, groups for a private communication between group members can be created based on multiple mobility profiles. In this case, groups will have a mobility profile tag at the creation points.

In an embodiment, different user types will be provided access to the system. For example, non-commercial user, commercial user etc. Access to channels, tabs, categories and sections of tabs may be done based on the user's type and user's mobility profile. Some user types can use all mobility profiles, while some other user types can only use limited mobility profile options (e.g. preselected static zones only).

In an embodiment, the system provides anonymity (hiding user names, profile details, used mobility profile when they post) in some channels/tabs or sections and revealing this info in other channels/tabs/sections.

In an embodiment, the system provides the user the ability to mask the exact address to only reveal the suburb. This can be done based on the channel and the user's mobility profile.

In an embodiment, the system provides the user the ability to limit the distance of the visibility of his post. This means, that if selected, the user A's post can be seen only for a defined maximum distance to other users (where the distance between user A's mobility profile and other users mobility profile geolocation centre). This can be done based on the channel and user mobility profile.

Figure 9:
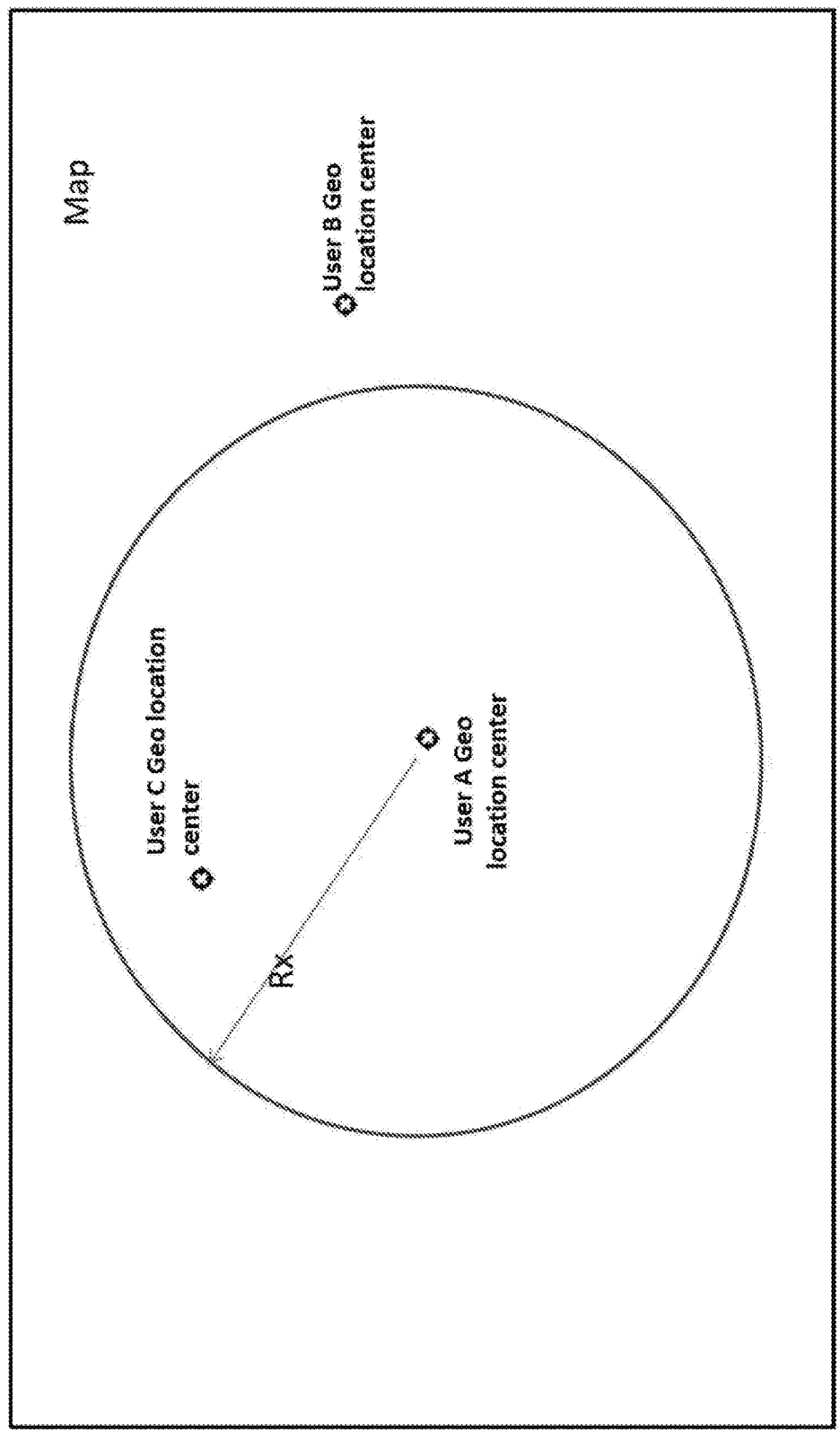
FIG. 9 shows a schematic view of an example of the post's limit distance visibility and the mobility profile masking function.

FIG. 9 shows a diagram for the "post's limit distance visibility" and the "mobility profile masking".

In an embodiment, the user can decide to limit the distance visibility of his created content to other users. The user can also mask his post for some specific mobility profiles.

In an embodiment, the user who posts can tag his post not to be visible to specific users accessing the system via a specific mobility profile.

In this diagram, as an example, Rx is the defined user A post distance limit visibility. If user C's geolocation centre is within this radius, and if user A selects the post limit distance visibility, user C will be able to see user A's post. For user B, if he is outside the Rx, he will not be able to see user A's post.

Now, if user A selected to mask his post for a specific mobility profile and if user C is within the post distance limit visibility, but is accessing the application using a mobility profile that user A decided to mask in his post, then user C will not be able to see the post of user A.

Figure 10:
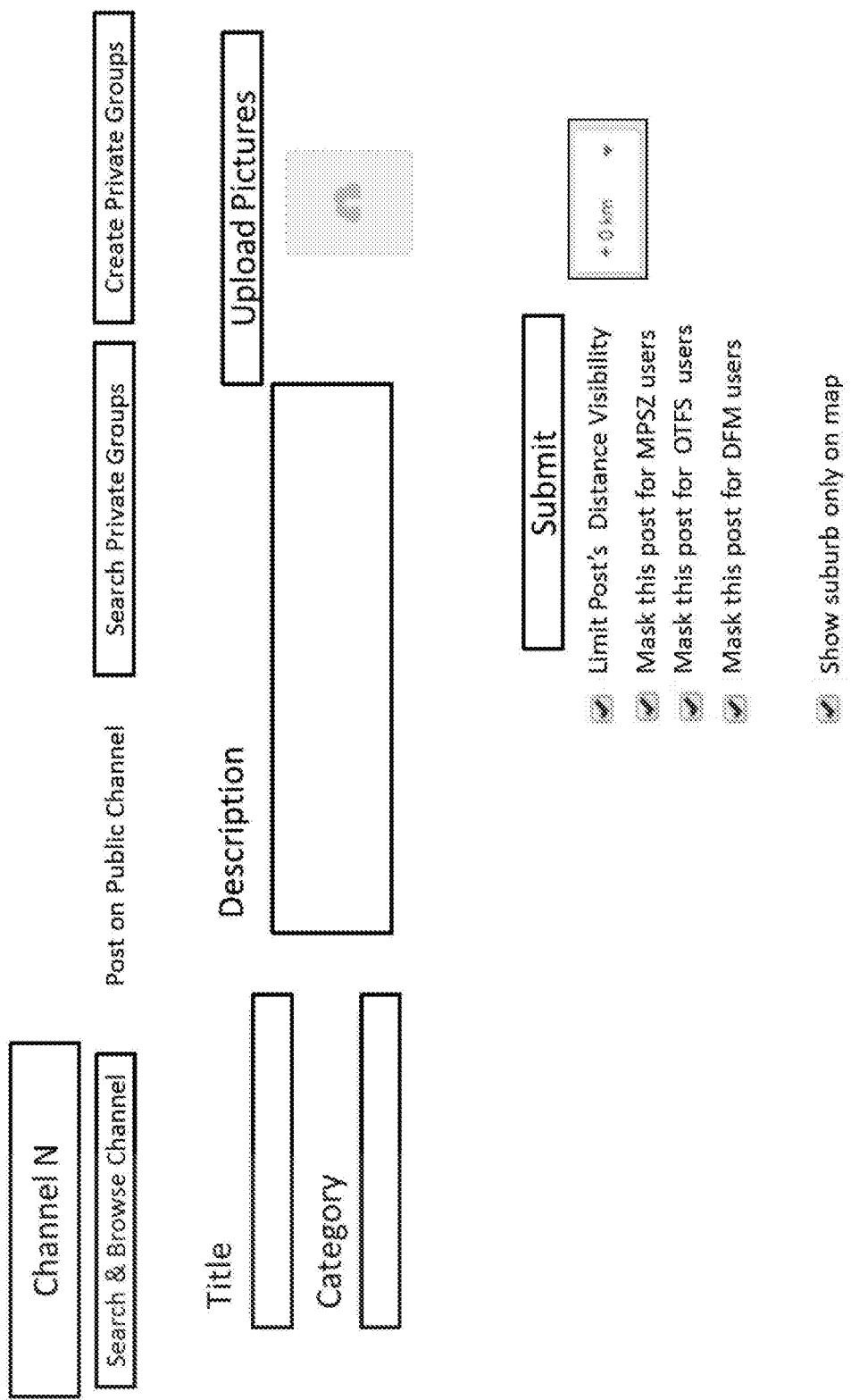
FIG. 10 shows a schematic view of an example of the graphical user interface showing the post distance visibility and the mobility profile masking options.

FIG. 10 shows a conceptual diagram illustrating an example of the graphical user interface showing the post distance visibility and the mobility profile masking options.

Preferably, when content is created, a user can only use one mobility profile, however it will be appreciated that this should not limit the scope of this invention as one consolidated application screen could allow one user to engage multi mobility profiles at the same point of time where/when the user (as a main user) can create content simultaneously at the same point of time, using different mobility profiles and using different channels.

In another embodiment, the user can have more granular options to mask or hide the created content for some sub mobility profiles in specific. For example: Mask the content for all users except the actual international tourists (DFMi). This user interface is just an example and should not limit the type of content that can be created or shared or the mobility profiles or the sub mobility profiles that can be selected for the content masking.

In an embodiment, the system provides a controlled access to specific channels for some mobility profiles not to allow a specific location (e.g. a PSZ) to be accessed by the user via another mobility profile (e.g. OTFS or DFM). In this case, a geolocation zone will be accessed only by a user via one mobility profile and not via another mobility profile. For example, the system may allow that the Geographical areas defined by a user as a static zone(s), to be blocked by the administrator/backend system for other mobility profiles for the same user.

Figure 8:
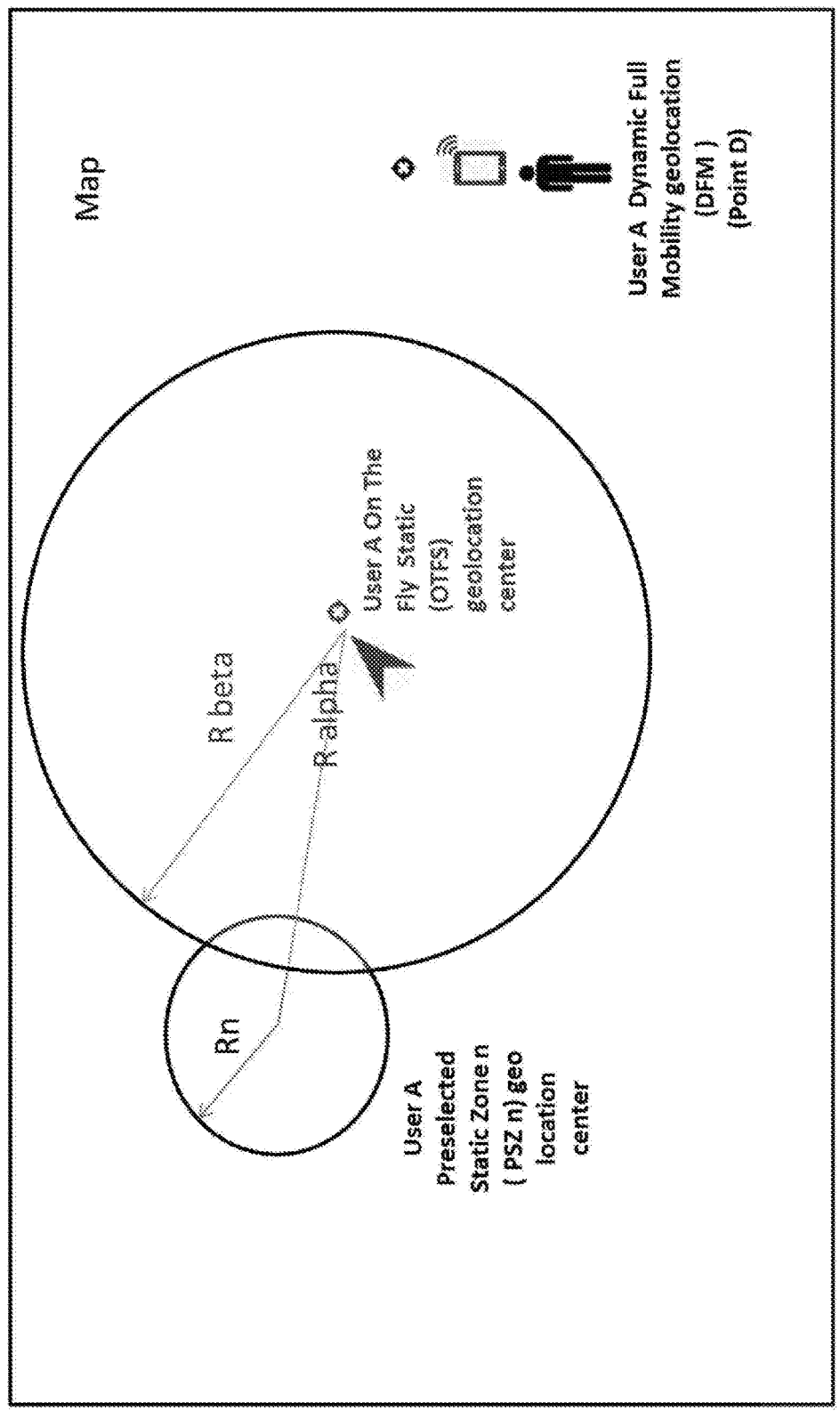
FIG. 8 shows a schematic view of an example of the Mobility profiles Geolocation zones block function.

FIG. 8 shows a diagram of the Mobility profiles Geolocation zones block.

The "Mobility Profile geolocation zones block" module will block some Geographical areas, e.g. tagged by a user as a PSZ, when the user tries to access this geographical area via a different mobility profile. Hence, if user Alpha preselects point y as his PSZ1, if he will try to access this geographical location via the OTFS or the DFM mobility profile, access will be denied. The threshold distances to block access (between the centres of, for example, PSZ1 and DFM or OTFS mobility profiles) can be defined by the administrator/backend server and can be dynamic to change if the geographical area is a metropolitan or rural area. For example 2 km if the geographical area is metropolitan and 10 km if the geographical area is rural.

As an example: for channel 1 (each channel can have different settings):

Let's assume user A tries to access channel 1 (or a tab or section of channel using the OTFS or DFM mobility profile. To explain further, assuming R Alpha is the distance between the geolocation centres of one of user A's PSZn profile and the centre of his OTFS or DFM mobility profile geolocation.

Let's assume that Rn is the mobility profile geolocation block radius of a channel for a zone. Rn can be dynamic as explained earlier, for example 2 km for metropolitan areas and 10 km for rural areas.

Then the following scenarios are supported by the computer implemented method:

R alpha>Rn: Result, user A will be able to activate the OTFS or DFM mobility profiles. He will be able to see all posts (e.g. within R beta except the posts made in the circle of the Mobility profiles Geolocation zones block).

R alpha<Rn: Result, user A will not be able to activate the OTFS or DFM mobility profiles. The user will need to leave (as OTFS or DFM mobility profiles) the Geolocation zone's block area before being able to activate the OTFS or DFM mobility profiles.

It should be noted that the maximum search or browse radius can be limited for some channels, for some user types, for some mobility profiles The above is just an example and should not limit the scope of this invention as other methods for the mobility profile geolocation zones block could be used for some user types, for some channels, for some mobility profiles.

Figure 11:
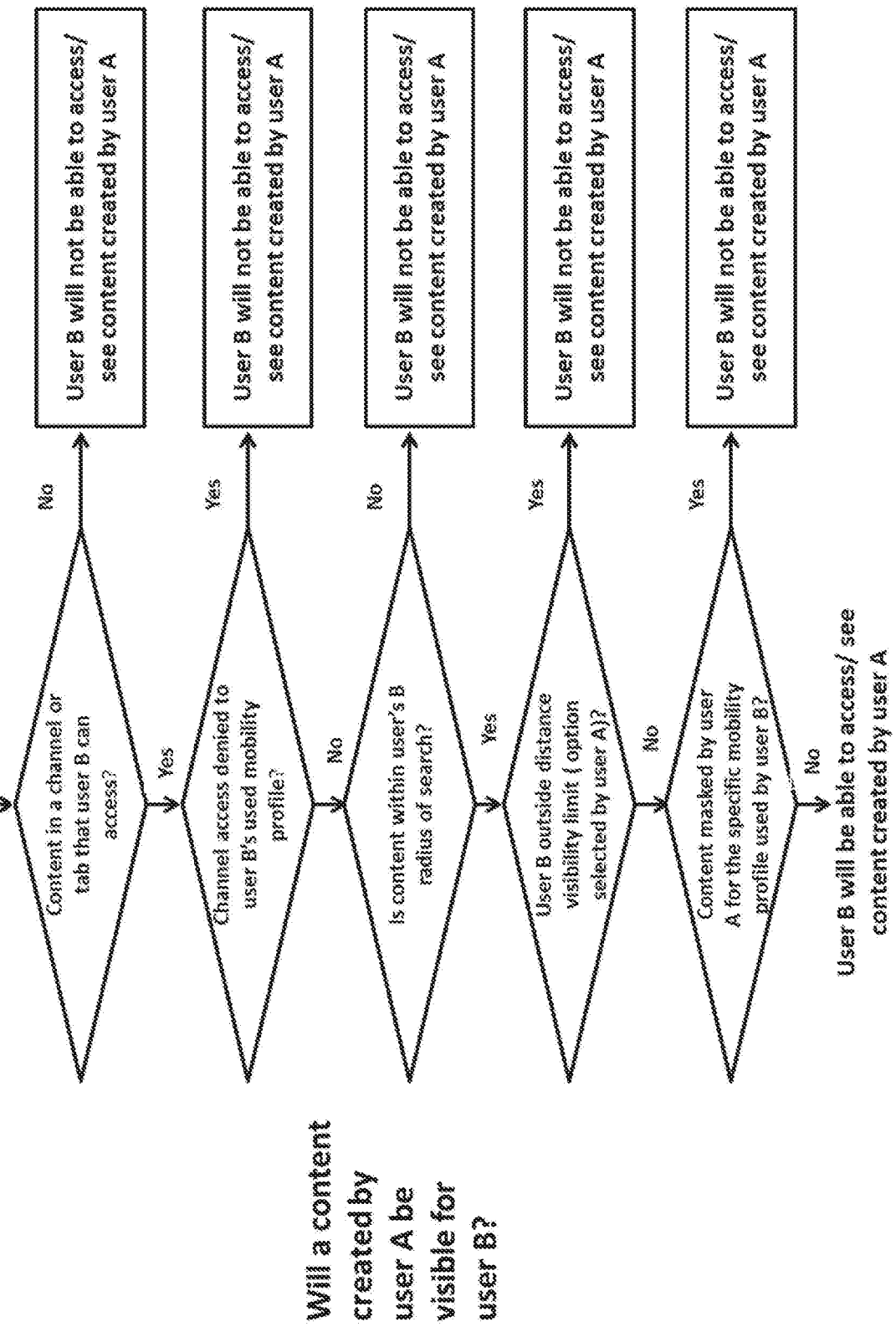
FIG. 11 is a schematic view of a process flow chart showing the post visibility decision tree.

FIG. 11 shows a process flow chart for the post visibility decision tree. This covers the channel access, channel mobility profile access, post distance limit visibility, mobility profile post masking.

Figure 12:
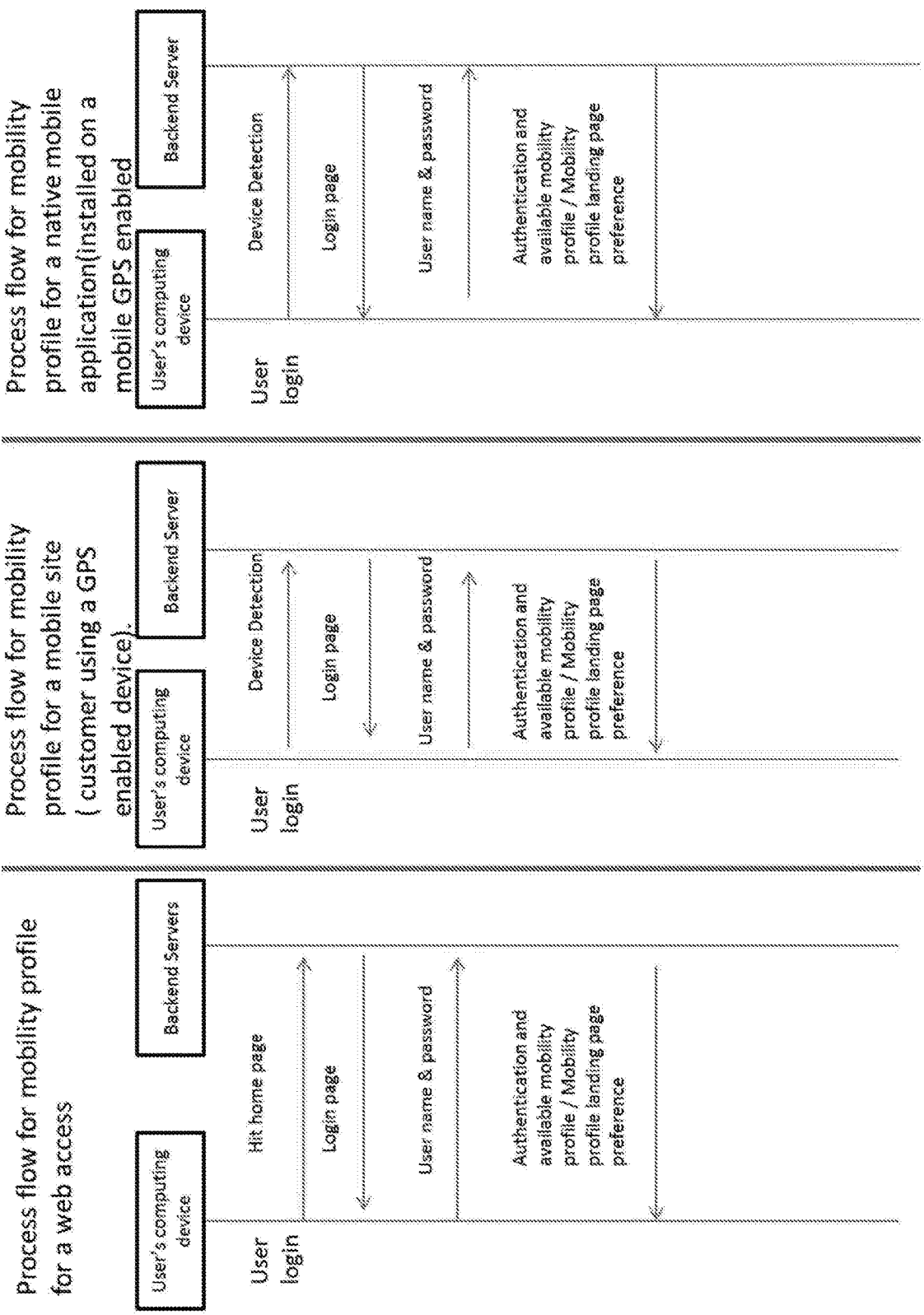
FIG. 12 shows a schematic view of the login flow process and mobility profile for a web access, mobile site and native mobile application.

FIG. 12 shows the Login flow process and mobility profile for a web access, mobile site and native mobile application.

The backend server can be based on a single tier, 2 tier or 3 tier architecture. In this case, when the user logs in, and after his authentication, the available mobility profiles/Mobility profile landing page preference are pushed to his computing device.

Figure 13:
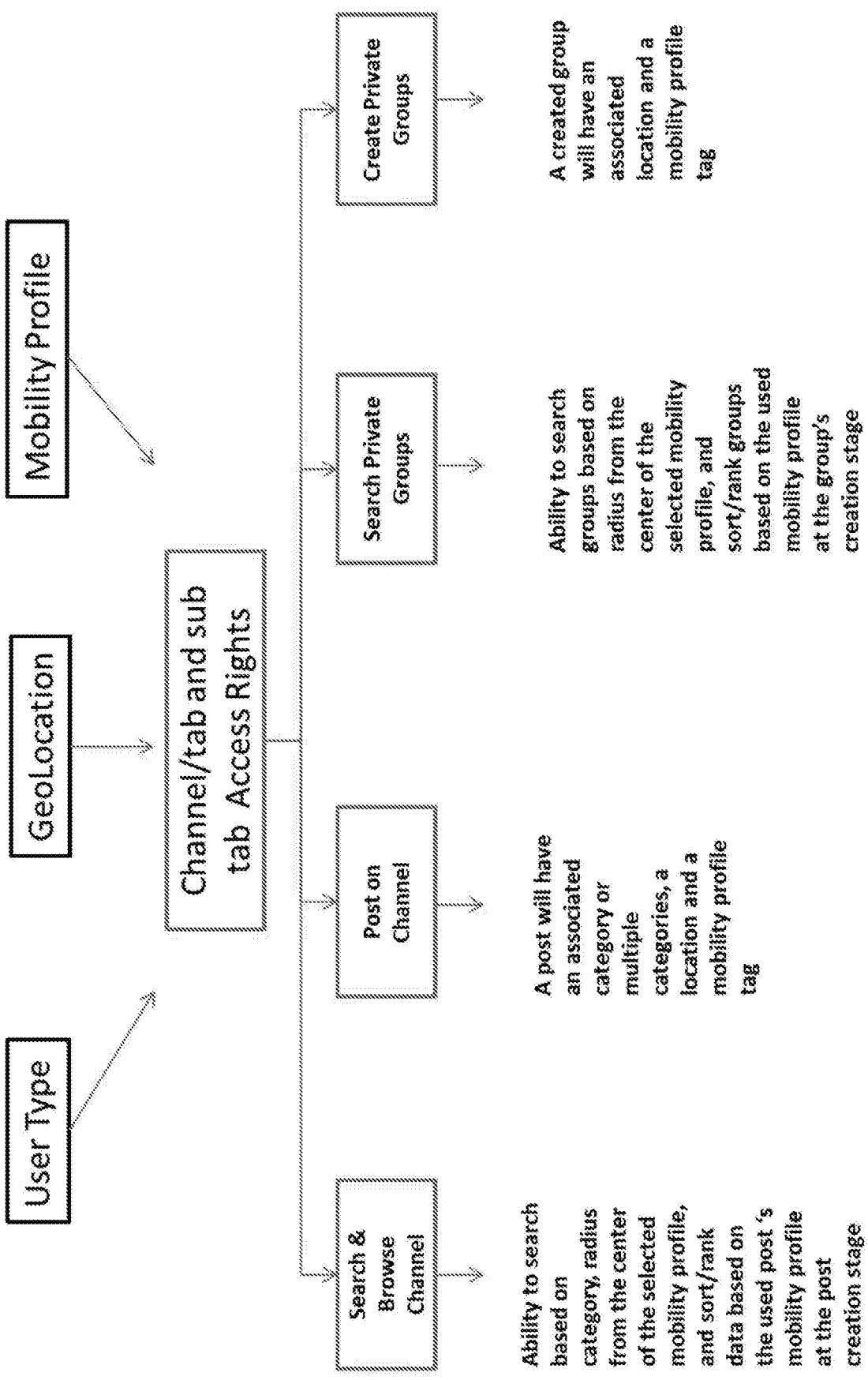
FIG. 13 is a schematic view of a diagram for the channel and tabs access rights based on the user type and mobility profile.

FIG. 13 shows a block diagram for the channel and tab access rights based on the user type and mobility profile.

The type of content that the user can access doesn't depend only on the location or the user type or the channel tabs or sub sections, but depends also on the engaged mobility profile he is using and the mobility profile used when the content he is trying to access was created. It's not just the location only as per all other methods of the prior art. For previous art, the created content is based purely on location retrieved on demand by a user as required, not based on mobility profile. In this diagram, post or group are used as an example of content, however, this should not limit the scope of the content to be created to only post or group as other content that can be created and shared can be video feeds, SMS messages, groups, files, alarms, sensors data, photographs, weather forecast data etc.

Example of user types: Law enforcement, emergency services, councils, public transport, resident, business, trade professionals. The user can be a human, machine, sensor or any type of application program interface such as weather API, news API etc. The holistic application access will change based on the user type. The user type will preferably have a separate user type logo associated with the created content. For government users, their accounts could be created manually after filling an online contact form and their details verified manually.

Government users may have access or rights to share content on some specific channels or tabs or sub tabs that other users are only able to read. Example: a "Police Broadcast" channel—content creation tab or sub tab can only be accessed by police, not by other users allowing only a subscribed police officer to create content on this tab, sub tab or section of the channel. This is to make sure that the content generated on this channel is only generated by police authorities. Same for "Public Transport" or "Council" Channels where only public transport officers and council officer can create content on these channels or on specific tabs or sub tabs on these channels. Other commercial examples could be businesses. For example, a restaurant accesses the "deals" channel content creation tab or content creation sub tab and creates differentiated offers or deals with variable discounts for specific user types and specific mobility profiles. For example, a 10% discount for MPSZ1 (mobility profile) AND residents (user type) or 20% discounts for business catering (user type business) and MPSZ1 (mobility profile); or 15% discount for all DFM mobility profile (users in the area); or more specific a 30% discount for trade professionals (user type) AND who are on the move in the area (DFM mobility profile).

If it's a fast food chain, the headquarters can even create different deals anywhere on the map via using the OTFS mobility profile irrespective of the fast food chain headquarter location (MPSZ1) by providing the stores address or just pointing at participating fast food chain stores on the map before creating the content.

Moreover, a main user can create secondary user accounts where the difference between the secondary user and the main user is just the ability of the main user to create secondary accounts. A secondary user may have a different logo or tag to differentiate from the main user. Moreover, another tag could be added to differentiate the type of users if it's a human, pet, machine, API, smart device, wearable device or sensor. For example: a police station could be the main user with the code Up1$h$ where p refers to police and $h$ refers to human. The police station Up1$h$ can create secondary user accounts for two field police officers such as Up2$h$ and Up3$h$ as well as secondary account for sensors or alarms such as Up7$s$ where s refers to a sensor such as bank alarm. The police station Up1*h* (main user) can create crime alerts via using the OTFS and via designating the location of the crime on the map or providing the address while at the same point of time the field officers Up2*h* and Up3*h* (secondary users) can create as well crime alerts or accidents warnings in real time, on site and at the crime or accident scenes while they use the DFM mobility profile. They can do so while restricting the content to be accessed only by residents and not by users who use the DFM and OTFS or any combination they like. Other police user types could be child sex offenders wearable tracking device to provide community/police monitoring.

Another example is that of a council (or municipality) (or similar governing body) that can create secondary user accounts for its field officers or its traffic light sensors, noise sensors, pollution sensors etc.

Another example is a residential user (resident) such a father 'Ur1*h*' can create secondary user accounts for his wife 'Ur2*h*' and son 'Ur3*h*', or his pet's microchip, his home smart alarm 'Ur5*s*', home smart central air condition 'Ur4*s*', and so on ad infinatum. For privacy reasons for some type of users and use cases, the main user could make the content generated by the secondary users visible to all users, or only to himself/herself as the main user, or only to himself/herself and to his associated secondary users.

There are four tabs in this diagram as an example. More tabs can be added and this diagram shouldn't limit the scope of this invention.

Figure 14:
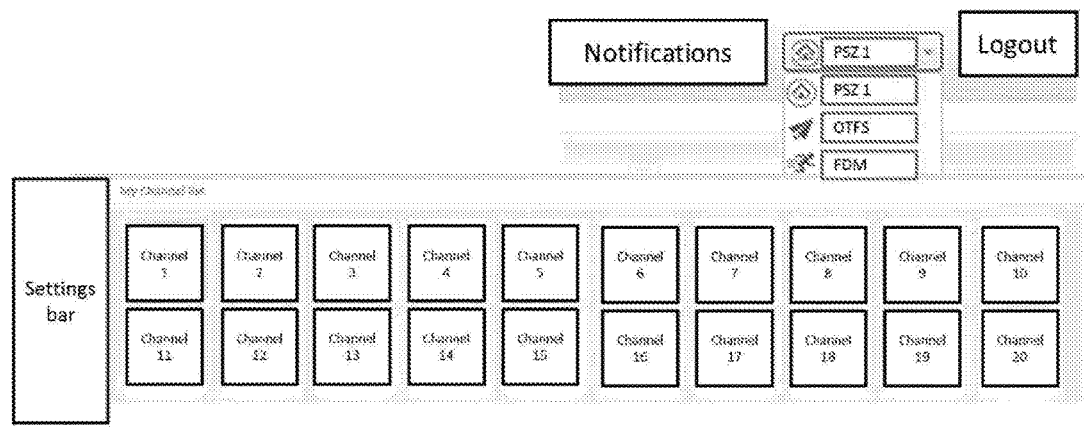
FIG. 14 illustrates a schematic view of an example of the graphical user interface showing the channels & mobility profile switching module.

FIG. 14 shows a conceptual diagram illustrating an example of the graphical user interface showing the channels & mobility profile switching module.

In this example, only one static zone is shown. It should be noted that multiple static zones are supported by the system.

Figure 15:
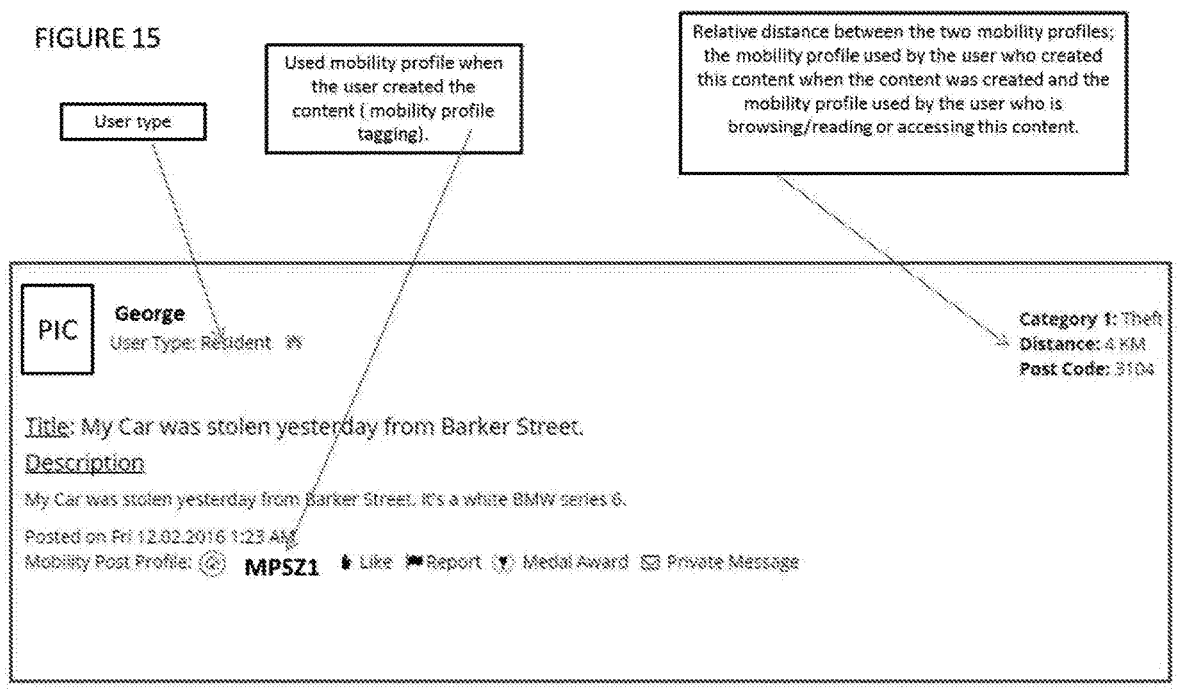
FIG. 15 illustrates a schematic view of an example of the graphical user interface showing how the mobility profile will be associated with a user post.

FIG. 15 shows a conceptual diagram illustrating an example of the graphical user interface showing how the mobility profile will be associated with a user post; meaning the mobility profile tagging. This figure also shows the user type who created the content and the relative distance between the two mobility profiles; between the user who created the content at the time of the creation of the content and the mobility profile of the other user who is reading or accessing the content.

Figures 16, 17:
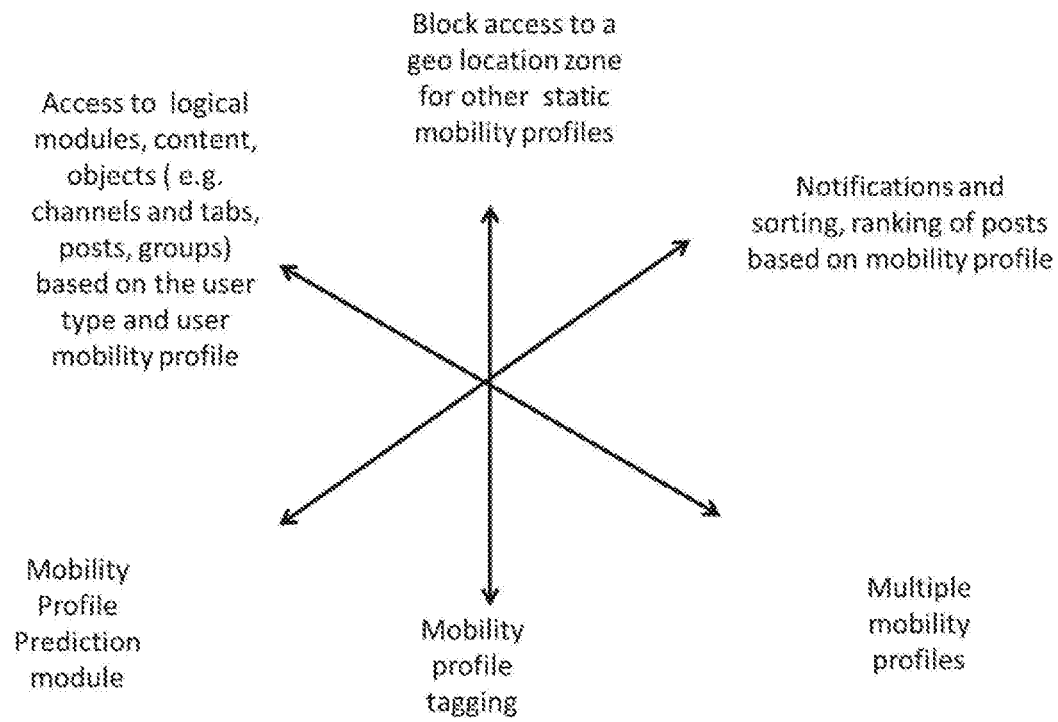
FIG. 16 illustrates a schematic view of an example of the graphical user interface and the mobility profile landing page preference selection.
FIG. 17 shows a schematic view of a hexa-mobility profile method/system logic diagram.
Figure 19:
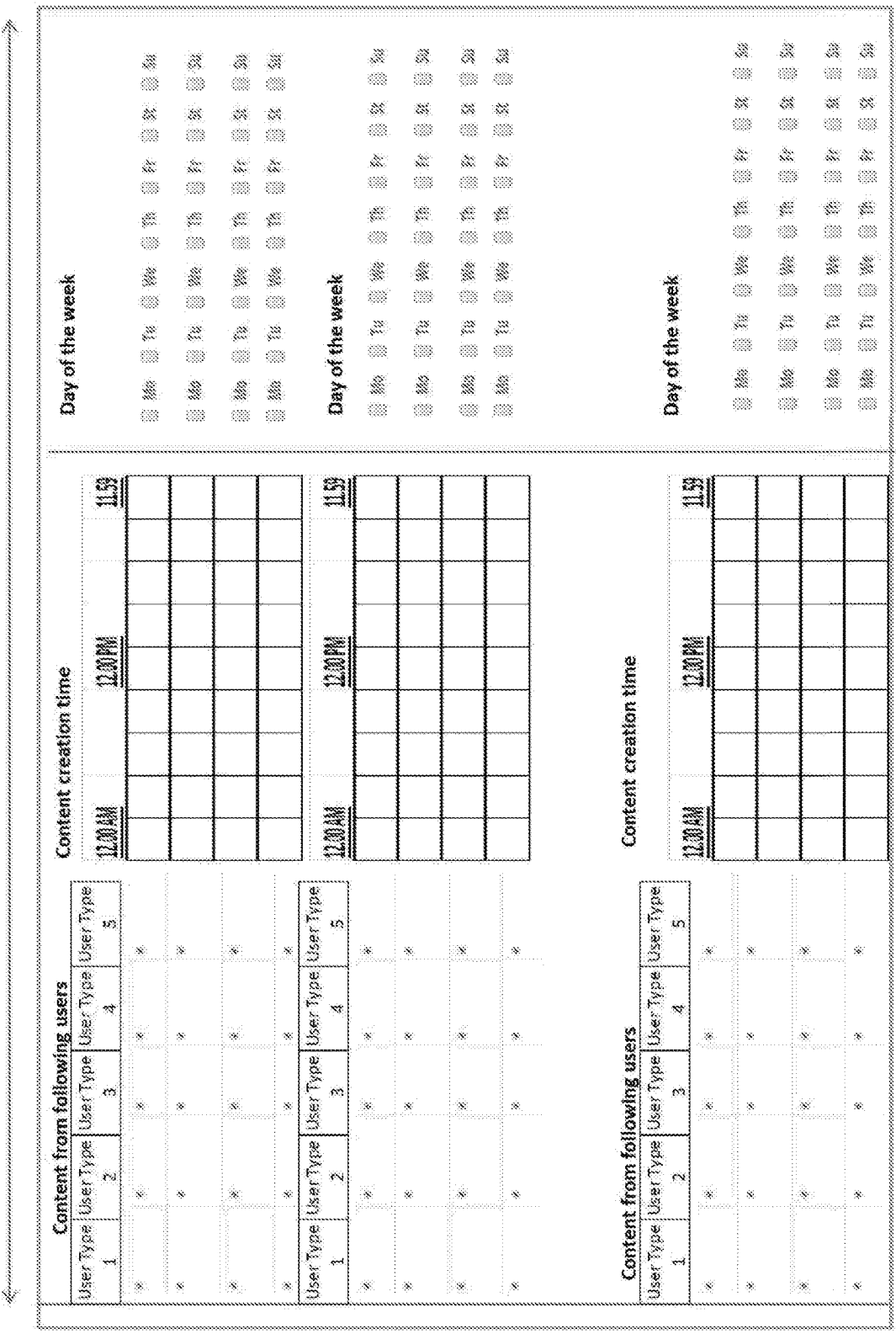
FIG. 19 shows a schematic view of an example of the graphical user interface for additional notifications selection criteria (user type and time).

FIG. 16 shows a conceptual diagram illustrating an example of the graphical user interface and the mobility profile landing page preference selection.

The user can select from the settings to select the automated mobility profile. This will be based on the mobility profile prediction module. The mobility profile prediction module will select the landing page mobility profile for the user. Alternatively, the user can select the landing page to be manually based on a specific mobility profile such as PSZ1, PSZ2, OTFS or DFM mobility profiles.

FIG. 20 shows another level of additional notifications selection options to be used with Section A in FIG. 6. This allows the user to get more detailed and tailored notifications. For these fields, the user will be able to get notifications from a specific user type and for content created at specific point of time during the day or during the week. Example, a family wants to get notification for an MPSZ2 (example, school zone of their kids) for any content created by a 'Police' user type and only during school days and school time (from 8 to 5 PM for example) and not to get any notifications outside this time window.

Figure 21:
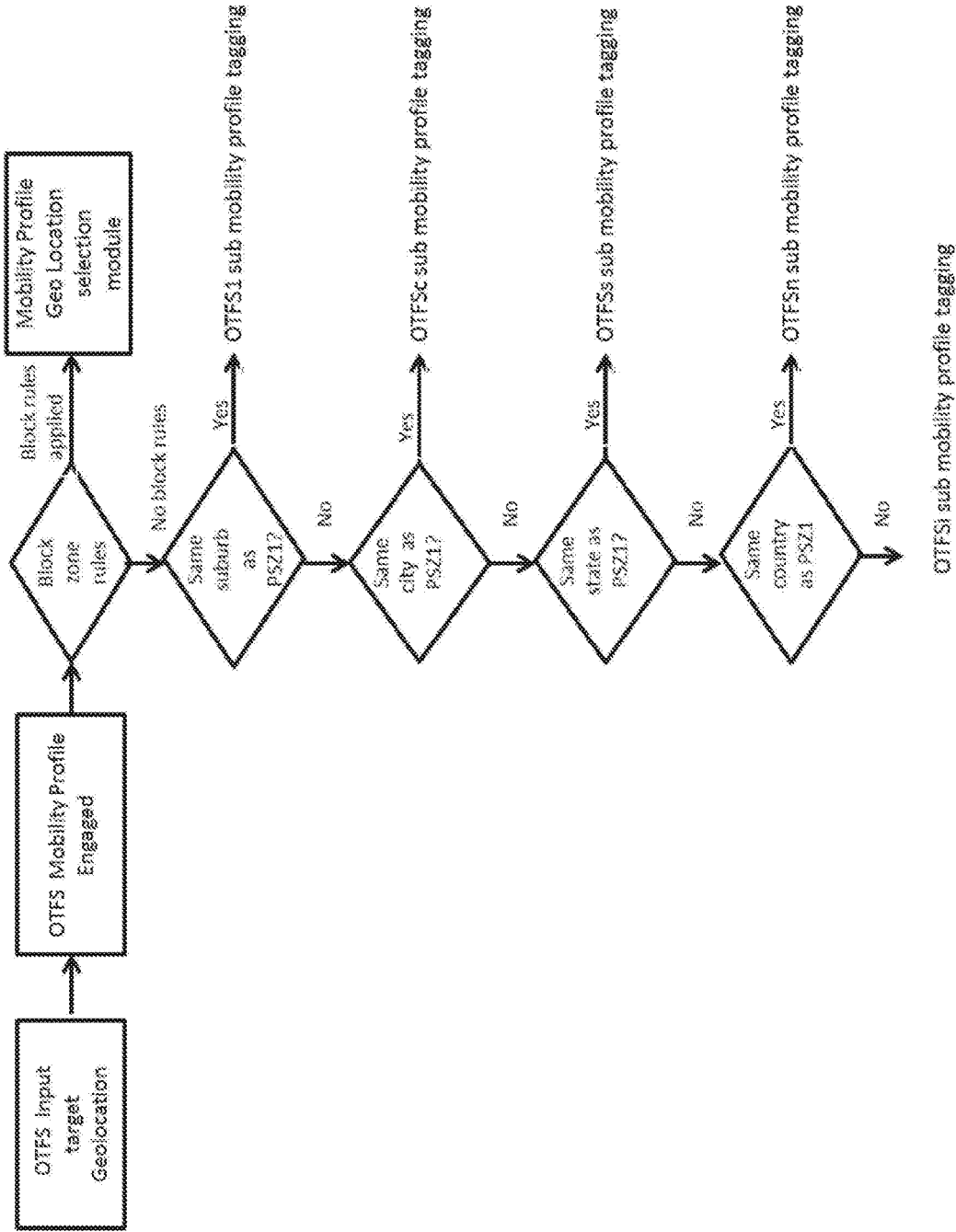
FIG. 21 shows a schematic view of a process flow chart showing the sub mobility profile access and tagging workflow for OTFS mobility profile.

FIG. 21 is a breakdown view of additional drill down sub mobility profile selection options to allow the user to get only notifications when content is created by users using some very specific sub mobility profiles as opposed to the main mobility profile selection options. It should be noted that this level of notifications content filtering can be used in other sections such as the browse, search content and location(s) news page and not only limited to the notifications part. This will allow the user to browse or search for specific created content based on all the selection criteria and combination options specified in the notifications.

In another embodiment, another level of mobility profile tagging is used to support new use cases mainly for the OTFS and DFM mobility profiles. Based on this new embodiment, a user using this OTFS and DFM mobility profiles will have additional levels of mobility profile tagging.

FIG. 21 is a process flow chart of the sub mobility profile tagging for OTFS. If there is a block zone rule, the application will reject the selection of the user and will force the user to go to the new mobility profile selection page or screen. For a resident example where PSZ1 is his home geolocation, if the user engages the OTS mobility profile and no block zone rules apply, the application will compare the OTFS geolocation to the PSZ1 and the following sub mobility profile tagging will apply:

OTFS1: means that the user is virtually visiting his PSZ1 zone/suburb.

OTFSc: means that the user is virtually visiting his PSZ1 city, but not in his PSZ1 suburb OTFSs: means that the user is virtually visiting his PSZ1 state, but not in his PSZ1 suburb and not in his PSZ1 city OTFSn: means that the user is virtually visiting his PSZ1 country, but not in his PSZ1 suburb and not in his PSZ1 city and not in his PSZ1 state OTFSi: means that the user is virtually visiting a country, but his PSZ1 is in another country. Hence, this user is an international virtual visitor.

Figure 22:
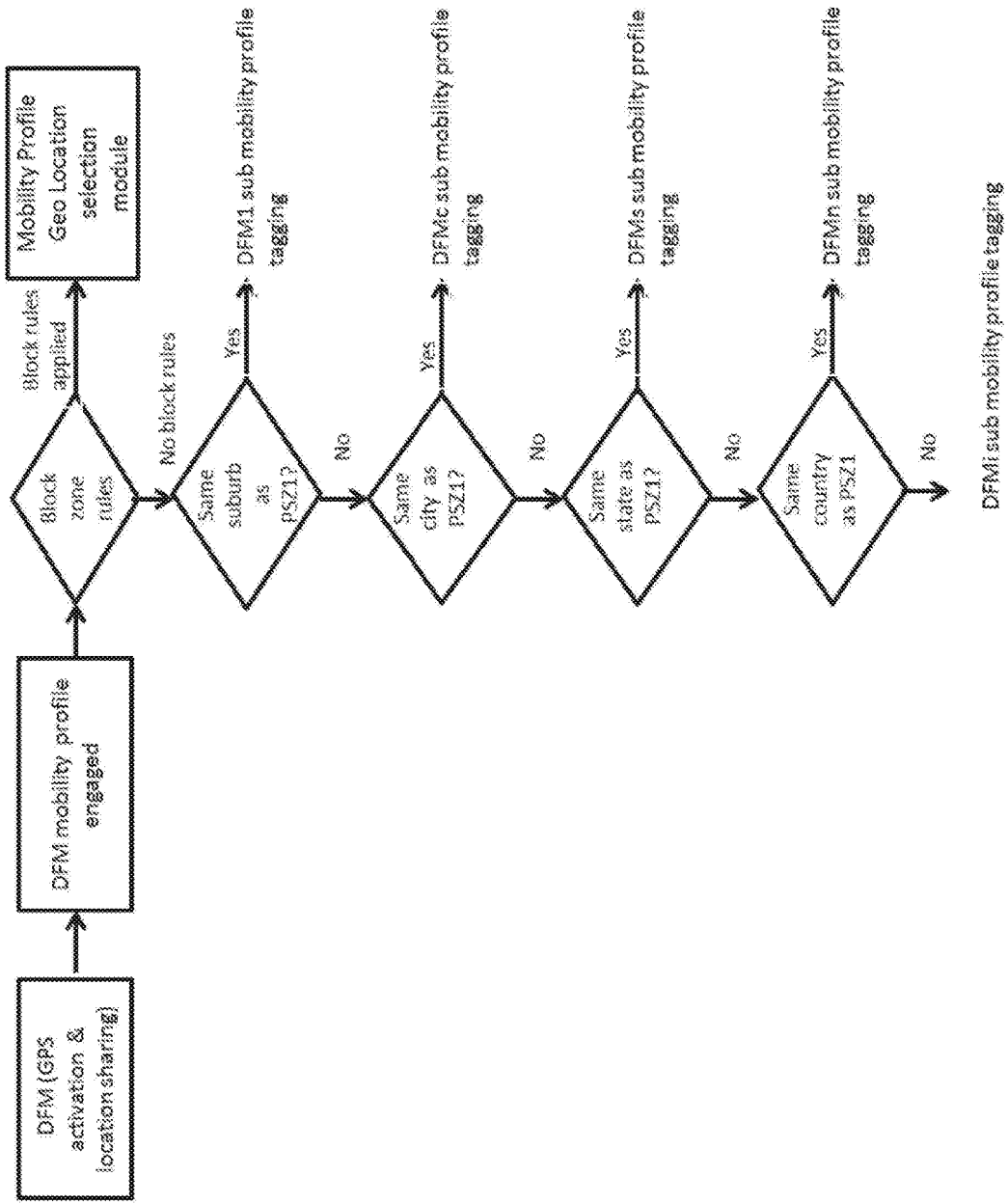
FIG. 22 shows a schematic view of a process flow chart showing the sub mobility profile access and tagging workflow for DFM mobility profile.

FIG. 22 is a process flow chart of the sub mobility profile tagging for DFM. If there is a block zone rule, the application will reject the selection of the user and will force a new mobility profile selection. For a resident example where PSZ1 is his home geolocation, if the user engages the DFM mobility profile and no block zone rules apply, the application will compare the DFM geolocation to the PSZ1 and the following sub mobility profile tagging will apply:

DFM1: means that the user is physically visiting his PSZ1 zone/suburb;

DFMc: means that the user is physically visiting his PSZ1 city, but not in his PSZ1 suburb;

DFMs: means that the user is physically visiting his PSZ1 state, but not in his PSZ1 suburb and not in his PSZ1 city;

DFMn: means that the user is physically visiting his PSZ1 country, but not in his PSZ1 suburb and not in his PSZ1 city and not in his PSZ1 state;

DFMi: means that the user is physically visiting a country, but his PSZ1 is in another country. Hence, this user is an international actual visitor or tourist.

All the content created/shared by the user will be tagged with the specific sub mobility profile tag.

Also, the ability to access, create and share content will depend on the user type, channel tab, channel sub tabs, location and the engaged sub mobility profile(s) too.

Sub mobility profile tagging supports additional use cases. Example: a hotel will be able to offer different accommodation rates for interstate or international tourists. Rate even can vary if these users are accessing the geolocation of the hotel and application as virtual visitors (OTS mobility profiles) or as actual visitors (DFM mobility profiles). Councils or city municipalities will be able to get accurate analytics about the interstate or international visitors heat map in the city and plan their resources and urban planning accordingly. This will help build a deep understanding of drivers for visitors, residents and businesses to enable adaptability to changing stakeholders' aspirations. This is crucially needed to address the inevitable growing demand for residents and business to participate effectively in the digital economy.

In another embodiment, the mobility profile tagging could include another level of mobility profile tagging which is to attach the MPSZ1 city or country too to the FDM and OTS profiles. Example, to include the PSZ1 city or country as additional sub mobility tags. Example: A French user who is using the DFM profile (actual visitor) when he is in Australia to check hotel rates around his actual location could be rerouted automatically to a more personalised content such as the hotel French language page as his mobility profile tags will show OTSi FR where FR refers to France. Hence the application will treat this user as an international actual visitor from France even if he is using a local mobile operator and not roaming as long as he uses the application.

In another embodiment, automation of smart devices can be supported using the 'automated mobility profile" selection and 'mobility profile grouping statuses of a main and secondary users.

FIG. 23 shows an example of the graphical user interface for Mobility profile status grouping and smart device notifications and actions triggering.

In another embodiment, the method for providing a social network system further comprises: providing a main user with the ability to create two or more separate closed groups: wherein a first group includes: the main user; and other secondary users associated with the main user and selected to be part of the group as per the main user's selection; and one or more further groups comprising: a plurality of further secondary users associated with the main user and selected to be part of these groups as per said main user's selection; wherein said secondary users are associated with a unique smart device (e.g. smartphone or tablet device) or smart machine (e.g. network-connected or internet-enabled devices or appliances). The application could then continuously monitor the collective first's group (all the users of the first group) mobility profile status changes and send specific notifications to the second group as configured. For example, and this should not limit the scope of this embodiment; if one or all 'grouped users' of the first group are using the automated mobility profile, the application will regularly check if their mobility profiles—for one or all together are set at MPSZ1 (home for example), and a notification 1 will be sent to the home smart devices (second group) that will take this notification 1 and execute a specific action, 'action 1'. Action 1 can be programmable on the smart device to execute a different specific instruction for each device. Now if all these users will leave their home (MPSZ1) AND/OR the accelerometer detects an acceleration, the application will automatically switch their mobility profile from MPSZ1 to other mobility profiles and a different notification 'notification 2' will be sent to the home smart devices that will take this notification 2 and execute a specific action, 'action 2'. Action 2 can be programmable on the smart device to execute a different specific action for each device. This workflow and graphical user interface is just an example and should not limit the scope of this invention as other grouping of users, user types, user mobility profiles combination, and notifications could be supported.

Figure 24:
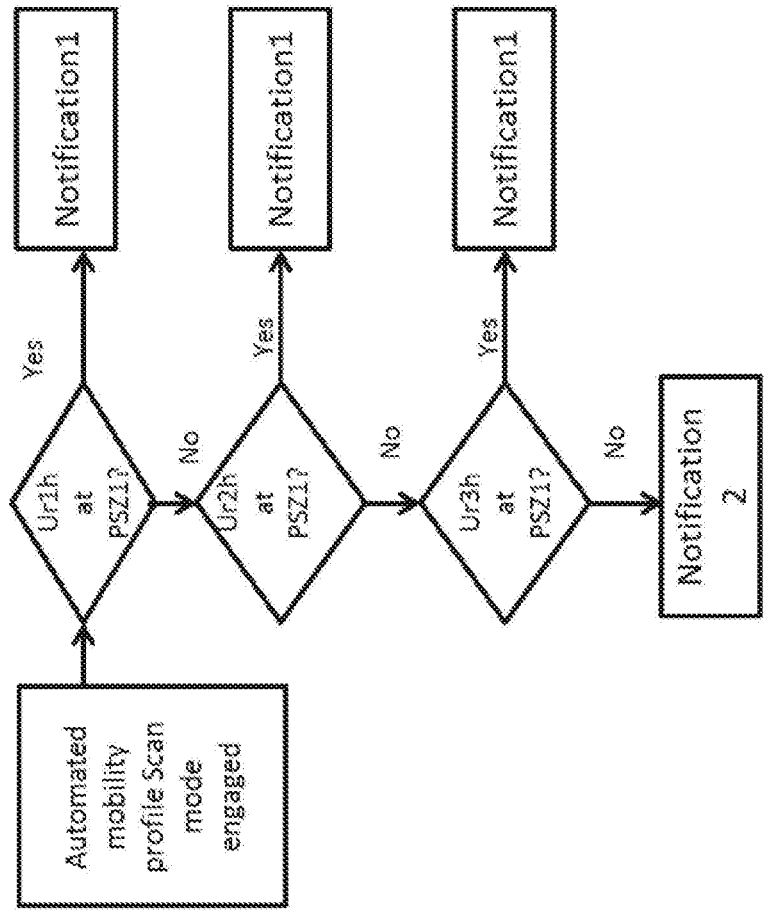
FIG. 24 shows a schematic view of a process flow chart showing the mobility profile status grouping check decision tree.

FIG. 24 Is a process flow chart showing the mobility profile status grouping check decision tree. For example, for a resident, group one will include the following: user 1 is a father 'Ur1$h$' (main user), user 2 is the wife 'Ur2$h$', user 'Ur3$h$' is the son. The application will send a notification to all the smart devices (group 2) when it will detect that the last family member left home (MPSZ1). This can be done using the automated mobility profile that will continuously scan the mobility profile of all the 3 users and switches their mobility profile from MPSZ1 to another mobility profile. If all are not on MPSZ1 anymore, 'notification 2' is sent to the smart devices and equipment who will translate this and execute 'action 2'. Example, the air condition 'Ur4$s$' will switch itself off to save energy, the home alarm'Ur5$s$' will arm itself, the indoor security cameras 'Ur6$s$', will start recording, the smart oven 'Ur7$s$' if accidently left on, will switch itself off and if the smart garage door 'Ur8$s$' if accidently left open, it will close itself.

Interpretation

Wireless:

The invention may be embodied using devices conforming to other network standards and for other applications, including, for example other WLAN standards and other wireless standards. Applications that can be accommodated include IEEE 802.11 wireless LANs and links, and wireless Ethernet.

In the context of this document, the term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. In the context of this document, the term "wired" and its derivatives may be used to describe circuits, devices, systems, methods, techniques, communications channels, etc., that may communicate data through the use of modulated electromagnetic radiation through a solid medium. The term does not imply that the associated devices are coupled by electrically conductive wires.

Processes:

Unless specifically stated otherwise, as apparent from the following discussions, it is appreciated that throughout the specification discussions utilizing terms such as "processing", "computing", "calculating", "determining", "analysing" or the like, refer to the action and/or processes of a computer or computing system, or similar electronic computing device, that manipulate and/or transform data represented as physical, such as electronic, quantities into other data similarly represented as physical quantities.

Processor:

In a similar manner, the term "processor" may refer to any device or portion of a device that processes electronic data, e.g., from registers and/or memory to transform that electronic data into other electronic data that, e.g., may be stored in registers and/or memory. A "computer" or a "computing device" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. The processing system further may include a memory subsystem including main RAM and/or a static RAM, and/or ROM.

Computer-Readable Medium:

Furthermore, a computer-readable carrier medium may form, or be included in a computer program product. A computer program product can be stored on a computer usable carrier medium, the computer program product comprising a computer readable program means for causing a processor to perform a method as described herein.

Networked or Multiple Processors:

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment. The one or more processors may form a web appliance, a network router, switch or bridge, or any machine capable of executing a set of instructions (sequential or otherwise) that specify actions to be taken by that machine.

Note that while some diagram(s) only show(s) a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Additional Embodiments

Thus, one embodiment of each of the methods described herein is in the form of a computer-readable carrier medium carrying a set of instructions, e.g., a computer program that are for execution on one or more processors. Thus, as will be appreciated by those skilled in the art, embodiments of the present invention may be embodied as a method, an apparatus such as a special purpose apparatus, an apparatus such as a data processing system, or a computer-readable carrier medium. The computer-readable carrier medium carries computer readable code including a set of instructions that when executed on one or more processors cause a processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

Carrier Medium:

The software may further be transmitted or received over a network via a network interface device. While the carrier medium is shown in an example embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media.

Implementation:

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Means for Carrying Out a Method or Function

Furthermore, some of the embodiments are described herein as a method or combination of elements of a method that can be implemented by a processor of a processor device, computer system, or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

Connected

Similarly, it is to be noticed that the term connected, when used in the claims, should not be interpreted as being limitative to direct connections only. Thus, the scope of the expression a device A connected to a device B should not be limited to devices or systems wherein an output of device A is directly connected to an input of device B. It means that there exists a path between an output of A and an input of B which may be a path including other devices or means. "Connected" may mean that two or more elements are either in direct physical or electrical contact, or that two or more elements are not in direct contact with each other but yet still co-operate or interact with each other.

Real-Time

The term, "real-time", for example "displaying real-time data," refers to the display of the data without intentional delay, given the processing limitations of the system and the time required to accurately measure the data.

Exemplary

As used herein, the term "exemplary" is used in the sense of providing examples, as opposed to indicating quality. That is, an "exemplary embodiment" is an embodiment provided as an example, as opposed to necessarily being an embodiment of exemplary quality for example serving as a desirable model or representing the best of its kind.

Embodiments

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description of Specific Embodiments are hereby expressly incorporated into this Detailed Description of Specific Embodiments, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Different Instances of Objects

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Specific Details

In the description provided herein, numerous specific details are set forth. However, it is understood that embodiments of the invention may be practiced without these specific details. In other instances, well-known methods, structures and techniques have not been shown in detail in order not to obscure an understanding of this description.

Terminology

In describing the preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar technical purpose. Terms such as "forward", "rearward", "radially", "peripherally", "upwardly", "downwardly", and the like are used as words of convenience to provide reference points and are not to be construed as limiting terms.

Comprising and Including

In the claims which follow and in the preceding description of the invention, except where the context requires otherwise due to express language or necessary implication, the word "comprise" or variations such as "comprises" or "comprising" are used in an inclusive sense, i.e. to specify the presence of the stated features but not to preclude the presence or addition of further features in various embodiments of the invention.

Any one of the terms: including or which includes or that includes as used herein is also an open term that also means including at least the elements/features that follow the term, but not excluding others. Thus, including is synonymous with and means comprising.

Scope of Invention

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms.

INDUSTRIAL APPLICABILITY

It is apparent from the above, that the arrangements described are applicable to the communication industries.

I claim:

1. A method for providing a social network system for allowing a user to: create content and share content with other users; and access content created by the other users; the method comprising:
   providing a plurality of mobility profile options for each user for continuous engagement with content associated with one or more mobility profiles in real-time, wherein said mobility profile options include:
      at least one first option comprising a unified combination of multiple preselected and stored first geographic locations and a first mobility status; and
      a second option comprising a unified combination of a temporary selected second geolocation and a second mobility status; and
      a third option comprising a unified combination of a continuously updating third geolocation and a third mobility status;
   wherein said mobility profiles are adapted to be activated one at a time or concurrently with any one or more mobility profiles;
   receiving a current mobility profile option selection of a user, wherein use of the system by a user is conditional upon the user having at least one or more user selected concurrent mobility profile option selection(s); and
   allowing a user to create content, wherein the content can be created with a user selected restriction upon the ability of other users to access the content based upon the current mobility profile option selection or selections of the other users,
   wherein the size of the first and/or second and/or third options geographical radius associated with each of the mobility profiles for search, browse or for notifications is granular to a channel and category level and is selected by the user, the method further comprising the step of:
   providing a plurality of channels,
   wherein users must select a channel in order to create content within the selected channel or access content created within the selected channel,
   wherein user access to a selected channel is subject to the user meeting access criteria, and wherein user access to a selected portion of a channel including a channel's tab or tabs or a channel sub tab or sub tabs is subject to the user meeting said access criteria.

2. The method of claim 1, wherein the content created while the user is connected to one or more mobility profiles is adapted to be associated with a user selected restriction upon the ability of other users to access the content based upon fixed or current geographical location of the other users falling within or outside of a user selected geographical zone or user selected distance from the fixed or current geographical location of the user's current mobility profile option selection and the other users using a current mobility profile option selection that is not restricted by the user, and wherein the mobility profile is user configurable such that the user can restrict the user's own accessibility to content created by other users, wherein the content restriction is based upon the created content being created within a geographical zone corresponding to the user's current mobility profile option selection.

3. The method of claim 1, wherein for the first option or one of the first options the first geographical location is a fixed geographical location selected by the user before or during selection of the current mobility profile option, or a stored fixed geographical location preselected by the user.

4. The method of claim 3, wherein multiple first options are available as different selectable mobility profile options, each unique first option defining different preselected fixed first geographical locations.

5. The method of claim 4, wherein a user is denied access to content having access criteria defined by any of the first geographical zones of the user's non-selected mobility profile first options regardless of whether the user's current mobility profile option selection would otherwise meet the access criteria.

6. The method of claim 1, wherein created content is tagged with the current mobility profile selection of the user that created the content and the tag is displayed to other users that can access the created content.

7. The method of claim 1, wherein users receive notifications of when there is newly created and accessible content, wherein the social network system is adapted to provide a user that is simultaneously connected to a plurality of mobility profiles with notifications of content created in association with each of the connected mobility profiles.

8. The method of claim 1, wherein multiple content that is accessible for a user is ranked to determine an order of displaying the multiple content to the user, and wherein the ranking is based upon one or more of the following: the user's current mobility profile option selection; the current mobility profile option selection applicable to the user that created the content at the time the content was created; type of content; content category; distance of the geographical location of the current mobility profile option selection applicable to the user that created the content at the time the content was created relative to the geographical location of the user's current mobility profile option selection; stored user preferences; and predicted user preferences.

9. The method of claim 1, wherein the access criteria includes restrictions based upon one or more of: the current mobility profile option selection of the user, the user-type associated with the user; or the user's location.

10. The method of claim 1, wherein a user can select to change to a different mobility profile option while accessing the system which becomes the current mobility profile option selection, or wherein the system automatically selects a current mobility profile option selection for the user based upon a preselected user preference, or a prediction employing a user's history of use.

11. The method according to claim 1, wherein the type of content that can be created includes one or more of: posts, calendar events, private user groups video feeds, SMS messages, files, alarms, sensor data, photographs, or weather forecast data.

12. The method for providing a social network system according to claim 1, comprising:
providing a plurality of user-types associated with the plurality of mobility profile options, and
wherein content associated with one or more mobility profiles comprises user-type access restrictions to restrict interaction with the content to selected user-types.

13. The method for providing a social network system as claimed in claim 1, wherein the method further comprises:
supporting the creation of main and secondary users;
wherein a main user can create multiple secondary users wherein the difference between a main user and a secondary user is the ability of the main user to create secondary users and wherein secondary users can be humans or sensors or smart devices or wearables, APIs or machines,
supporting the creation of a separate and different identification tag for main and secondary users associated with any content they create or share and differentiating if this secondary user is a sensor or a human or a pet or an API or a machine or a wearable etc.

14. The method for providing a social network system as claimed in claim 1, wherein the method further comprises:
providing a main user with the option to make the content generated by secondary associated users visible to all users, or only to himself/herself as the main user, or only to himself/herself and to his associated secondary users.

15. The method for providing a social network system as claimed in claim 1, wherein the users are any combination of or one or more of: persons, devices, sensors, wearables, microchips for pets, machines, and APIs.

16. A social network system for allowing users to create and share and access content with other users, said system comprising:
a database for storing data pertaining to users of the system; and
a server connected to a communications network for communicating with user devices over the communications network; wherein the server is programmed to provide the method according to claim 1.

17. A method for providing a social network system for allowing a user to: create content and share content with other users; and access content created by the other users; the method comprising:
providing a plurality of mobility profile options for each user for continuous engagement with content associated with one or more mobility profiles in real-time, wherein said mobility profile options include:
at least one first option comprising a unified combination of multiple preselected and stored first geographic locations and a first mobility status; and
a second option comprising a unified combination of a temporary selected second geolocation and a second mobility status; and
a third option comprising a unified combination of a continuously updating third geolocation and a third mobility status;

wherein said mobility profiles are adapted to be activated one at a time or concurrently with any one or more mobility profiles;
receiving a current mobility profile option selection of a user, wherein use of the system by a user is conditional upon the user having at least one or more user selected concurrent mobility profile option selection(s); and
allowing a user to create content, wherein the content can be created with a user selected restriction upon the ability of other users to access the content based upon the current mobility profile option selection or selections of the other users,
wherein the method further comprises the steps of:
providing one or more sub-mobility-profile options for the second or the third mobility profile options,
for a differentiated and enriched mobility profile access to content and content creation, content sharing and content masking,
wherein the multiple sub mobility profile options are selected by the user or for the user and wherein any content created and shared by the user while this profile is engaged will be tagged with the sub mobility profile tag.

18. A method for providing a social network system for allowing a user to: create content and share content with other users; and access content created by the other users; the method comprising:
providing a plurality of mobility profile options for each user for continuous engagement with content associated with one or more mobility profiles in real-time, wherein said mobility profile options include:
at least one first option comprising a unified combination of multiple preselected and stored first geographic locations and a first mobility status; and
a second option comprising a unified combination of a temporary selected second geolocation and a second mobility status; and
a third option comprising a unified combination of a continuously updating third geolocation and a third mobility status;
wherein said mobility profiles are adapted to be activated one at a time or concurrently with any one or more mobility profiles;
receiving a current mobility profile option selection of a user, wherein use of the system by a user is conditional upon the user having at least one or more user selected concurrent mobility profile option selection(s); and
allowing a user to create content, wherein the content can be created with a user selected restriction upon the ability of other users to access the content based upon the current mobility profile option selection or selections of the other users,
wherein the method further comprises the step of:
providing a main user with the ability to create two or more separate closed groups:
wherein a first group comprises:
the main user; and
other secondary users associated with the main user and selected to be part of the group as per the main user's selection; and
one or more further groups comprising:
a plurality of further secondary users associated with the main user and selected to be part of these groups as per the main user's selection;
wherein said secondary users are associated with a unique smart device or smart machine.

19. The method for providing a social network system as claimed in claim 18, wherein the method further comprises:
supporting mobility profile status grouping and the continuous collective monitoring of mobility profile status changes for all the users of the first group described, wherein the application monitors the collective change of the first group's mobility profile status from a status to another or other users, and
sending different notifications to a second group when a mobility profile status grouping change for the first group is detected wherein the different notifications are adapted to trigger the execution of a specific action, command or automation of actions for the users of the second group associated with smart devices and/or smart machines.

* * * * *